United States Patent [19]
Kim et al.

[11] Patent Number: 5,807,974
[45] Date of Patent: Sep. 15, 1998

[54] FLUORENE-BASED ALTERNATING COPOLYMERS FOR ELECTROLUMINESCENCE ELEMENT AND ELECTROLUMINESCENCE ELEMENT USING SUCH COPOLYMERS AS LIGHT EMITTING MATERIALS

[75] Inventors: Chung Yup Kim; Hyun Nam Cho; Dong Young Kim; Young Chul Kim; Jun Young Lee; Jai Kyeong Kim, all of Seoul, Rep. of Korea

[73] Assignee: Korea Institute of Science and Technology, Rep. of Korea

[21] Appl. No.: 756,036

[22] Filed: Nov. 26, 1996

[30] Foreign Application Priority Data

May 16, 1996 [KR] Rep. of Korea ............... 16449/1996

[51] Int. Cl.[6] .................................................. C08G 63/00
[52] U.S. Cl. ..................... 528/366; 313/507; 428/457; 428/690; 428/917; 528/176; 528/271; 528/330; 528/392
[58] Field of Search .................. 528/176, 271, 528/330, 366, 392; 428/457, 690, 917; 313/507

[56] References Cited

U.S. PATENT DOCUMENTS

| | | | |
|---|---|---|---|
| 3,401,152 | 9/1968 | Wessling et al. | 528/176 |
| 5,069,975 | 12/1991 | Nakada et al. | 428/457 |
| 5,121,029 | 6/1992 | Hosokawa et al. | 313/504 |

FOREIGN PATENT DOCUMENTS

| | | |
|---|---|---|
| 2-135361 | 5/1990 | Japan . |
| 3-152184 | 6/1991 | Japan . |
| 6-136360 | 5/1994 | Japan . |
| 7-26254 | 1/1995 | Japan . |
| 9203491 | 3/1992 | WIPO . |
| 9314177 | 7/1993 | WIPO . |

OTHER PUBLICATIONS

C. Zhang et al., "Blue electroluminescent diodes utilizing blends of poly(p–phenylphenylene vinylene) in poly(9–vinylcarbazole)", Synthetic Metals, 62 (1994) 35–40.

Katsumi Yoshino et al., "Gel chromism and anamalous luminescence in poly(3–alkylthiophene)", Synthetic Metals, 49–50 (1992) 491–497.

Michael E. Wright et al., "Organic NLO Polymers. 2. A Study of Main–Chain and Guest–Host $X^{(2)}$ NLO Polymers: NLO–phore Structure Versus Poling", Macromolecules 1994, 27, 3009–3015.

Yutaka Ohmori et al., "Blue Electroluminescent Diodes Utilizing Poly(alkylfluorene)", Japanese Journal of Applied Physics, vol. 30, No. 11B, Nov., 1991, pp. L1941–L1943.

Wai–Kin Chan et al., "Studies of Functionalized Poly(phenylenevinylene)s", Macromolecules 1995, 28, 6410–6415.

M.R. Andersson et al., "Electroluminescence from Substituted Poly(thiophenes): From Blue to Near–Infrared", Macromolecules 1995, 28, 7525–7529.

Gabriele Grem et al., "Realization of a Blue–Light–Emitting Device using Poly(p–phenylene)", Advanced Materials, 4 (1992) No. 1, pp. 36–37.

Paul L. Burn et al., "Syntheses of a Segmented Conjugated Polymer Chain Giving a Blue–shifted Electroluminescence and Improved Efficiency", J. Chem. Soc., Chem. Commun., 1992, pp. 32–34.

C.W. Wang et al., "Organic electroluminescent diodes", Appl. Phys. Lett. vol. 51, No. 12, Sep. 21, 1987, pp. 913–915.

J.H. Burroughes et al., "Light–emitting diodes based on conjugated polymers", Letters To Nature, vol. 347, Oct. 11, 1990, pp. 539–541.

*Primary Examiner*—Terressa Mosley
*Attorney, Agent, or Firm*—Ostrolenk, Faber, Gerb & Soffen, LLP

[57] ABSTRACT

The present invention relates to a fluorene-based alternating copolymer to be used as light emitting materials of electroluminescent elements having the following formula (I), and further relates to electroluminescent elements having an anode/luminescent layer/cathode structure, in which the fluorene-based alternating copolymer used as light emitting materials of the luminescent layer, or having a transporting and/or reflection layer added thereto, if necessary, is

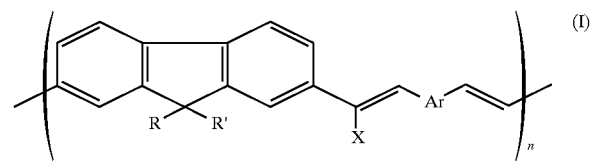

where R, R', X, Ar and n are defined in the text.

20 Claims, 27 Drawing Sheets

FLUORENE-BASED ALTERNATING COPOLYMERS FOR ELECTROLUMINESCENCE ELEMENT AND ELECTROLUMINESCENCE ELEMENT USING SUCH COPOLYMERS AS LIGHT EMITTING MATERIALS

BACKGROUND OF THE INVENTION

1. Field of the Invention

The present invention relates to fluorene-based alternating copolymers to be used as luminescent materials in manufacturing macromolecular electroluminescence (EL) elements, and relates to EL elements using such fluorene-based alternating copolymers as light emitting materials.

2. Description of the Prior Art

Examples of EL elements which have been studied thus far include inorganic semiconductors such as GaAs which have the advantages of being small in size, require little consumption of electric power, etc., and are currently being used as display devices having a small surface area, light emitting diode (LED) lamps, semiconductor lasers, and the like. However, in manufacturing such elements, extremely clean processing is required, and it is difficult to make LEDs of large surface area and it is difficult to obtain a blue light having good efficiency. Furthermore, there are inorganic semiconductors having fluorescent ions of metal compounds added thereto and inorganic EL elements made by dispersing inorganic semiconductors into high molecules, but these cause problems in semiconductor stability not only because they require a high operating voltage but also because they operate under high electric fields.

However, as organic EL materials (Appl. Phys. Lett., 51, p.913 (1987)) and macromolecular EL materials (Nature, 347, p.539 (1990)) capable of overcoming such problems are recently being developed, advances in research in this field are continuing to progress. When voltage is applied to an EL element manufactured by depositing organic dyes (Japanese unexamined (laid-open) patent publications 6-136360 and 7-26254), or by putting macromolecules having a conjugate double bond (Int'l patents WO92/03491 and WO93/14177) between an anode and a cathode, holes from the cathode and electrons from the anode are introduced, move to a luminescent layer and emit light when they recombine thereafter. Currently, efforts are being made to find applications of such EL elements for next generation flat panel color display devices, electrochemical cells, image sensors, photocouplers, and the like which use LEDs, which will replace cathode-ray tubes, gas plasma displays, liquid crystal displays used at present. Elements manufactured by deposition of organic dyes have problems in reproducibility and in making uniform films, and while macromolecule-based elements have overcome such problems to a certain degree, improved stability, efficiency and durability are still required for desired applications of practical commercial use. Poly(phenylene vinylene) (PPV), polythiophene (PTh) and polyphenylene-based macromolecules (Synth. Met., 50(1–3), p.491 (1992) and Adv. Mater., 4, p.36 (1992)), are known as representative macromolecular luminescent materials which have been studied up to now, but these materials have the disadvantage that the final material is insoluble in any organic solvent. The processing suitability is improved by introducing appropriate substituents and PPV or PTh derivatives (Synth. Met., 62, p.35 (1994), Adv. Mater., 4, p.36 (1994), and Macromolecules, 28, p.7525 (1995)) which emit diverse lights of blue, green and red colors are known but the manufacturing process of such derivatives is very complicated, and there are also problems in stability. Moreover, fluorene-based macromolecules which emit blue light (Jpn. J. Appl. Phys., 30, p.L1941 (1991)) have been reported but these have disadvantages in that they can not exhibit various other colors, and require the use of materials and manufacturing methods from which macromolecules with more diversified conjugate double bonds can not be made.

BRIEF DESCRIPTION OF THE DRAWINGS

FIG. 3-1 shows the ultraviolet spectrum (—) and photoluminescence spectrum (---) of a polymer according to Example 1 of the present invention;

FIG. 3-2 shows the ultraviolet spectrum (—) and photoluminescence spectrum (---) of a polymer according to Example 2 of the present invention;

FIG. 3-3 shows the ultraviolet spectrum (—) and photoluminescence spectrum (---) of a polymer according to Example 3 of the present invention;

FIG. 3-4 shows the ultraviolet spectrum (—) and photoluminescence spectrum (---) of a polymer according to Example 5 of the present invention;

FIG. 3-5 shows the ultraviolet spectrum (—) and photoluminescence spectrum (---) of a polymer according to Example 6 of the present invention;

FIG. 3-6 shows the ultraviolet spectrum (—) and photoluminescence spectrum (---) of a polymer according to Example 7 of the present invention;

FIG. 3-7 shows the ultraviolet spectrum (—) and photoluminescence spectrum (---) of a polymer according to Example 8 of the present invention;

FIG. 3-8 shows the ultraviolet spectrum (—) and photoluminescence spectrum (---) of a polymer according to Example 10 of the present invention;

FIG. 3-9 shows the ultraviolet spectrum (—) and photoluminescence spectrum (---) of a polymer according to Example 12 of the present invention;

FIG. 3-10 shows the ultraviolet spectrum (—) and photoluminescence spectrum (---) of a polymer according to Example 13 of the present invention;

FIG. 3-11 shows the ultraviolet spectrum (—) and photoluminescence spectrum (---) of a polymer according to Example 14 of the present invention;

FIG. 3-12 shows the ultraviolet spectrum (—) and photoluminescence spectrum (---) of a polymer according to Example 15 of the present invention;

FIG. 3-13 shows the ultraviolet spectrum (—) and photoluminescence spectrum (---) of a polymer according to Example 17 of the present invention;

FIG. 3-14 shows the ultraviolet spectrum (—) and photoluminescence spectrum (---) of a polymer according to Example 19 of the present invention;

FIG. 3-15 shows the ultraviolet spectrum (—) and photoluminescence spectrum (---) of a polymer according to Example 21 of the present invention;

FIG. 3-16 shows the ultraviolet spectrum (—) and photoluminescence spectrum (---) of a polymer according to Example 23 of the present invention;

FIG. 3-17 shows the ultraviolet spectrum (—) and photoluminescence spectrum (---) of a polymer according to Example 24 of the present invention;

FIG. 3-18 shows the ultraviolet spectrum (—) and photoluminescence spectrum (---) of a polymer according to Example 25 of the present invention;

FIG. 3-19 shows the ultraviolet spectrum (—) and photoluminescence spectrum (---) of a polymer according to Example 26 of the present invention;

FIG. 3-20 shows the ultraviolet spectrum (—) and photoluminescence spectrum (---) of a polymer according to Example 27 of the present invention;

FIG. 3-21 shows the ultraviolet spectrum (—) and photoluminescence spectrum (---) of a polymer according to Example 28 of the present invention;

FIG. 4-1 shows the voltage-current characteristic curve of a polymer according to Example 1 of the present invention;

FIG. 4-2 shows the voltage-current characteristic curve of a polymer according to Example 2 of the present invention;

FIG. 4-3 shows the voltage-current characteristic curve of a polymer according to Example 3 of the present invention;

FIG. 4-4 shows the voltage-current characteristic curve of a polymer according to Example 5 of the present invention;

FIG. 4-5 shows the voltage-current characteristic curve of a polymer according to Example 6 of the present invention;

FIG. 4-6 shows the voltage-current characteristic curve of a polymer according to Example 7 of the present invention;

FIG. 4-7 shows the voltage-current characteristic curve of a polymer according to Example 8 of the present invention;

FIG. 4-8 shows the voltage-current characteristic curve of a polymer according to Example 10 of the present invention;

FIG. 5-1 shows the voltage-electroluminescence characteristic curve of a polymer according to Example 6 of the present invention;

FIG. 5-2 shows the voltage-electroluminescence characteristic curve of a polymer according to Example 7 of the present invention; FIG. 5-3 shows the voltage-electroluminescence characteristic curve of a polymer according to Example 8 of the present invention;

FIG. 5-4 shows the voltage-electroluminescence characteristic curve of a polymer according to Example 10 of the present invention;

FIG. 6-1 shows the electroluminescent spectrum of a polymer according to Example 6 of the present invention;

FIG. 6-2 shows the electroluminescent spectrum of a polymer according to Example 7 of the present invention;

FIG. 6-3 shows the electroluminescent spectrum of a polymer according to Example 8 of the present invention;

FIG. 6-4 shows the electroluminescent spectrum of a polymer according to Example 10 of the present invention;

FIG. 7-1 shows the photoluminescence spectrum of a film obtained by blending a polymer according to Example 6 of the present invention with polyvinylcarbazole (numbers in the box represents the weight fraction of the polymer);

FIG. 7-2 shows the photoluminescence spectrum of a film obtained by blending a polymer according to Example 7 of the present invention with polyvinylcarbazole (number in the box represents the weight fraction of the polymer);

FIG. 7-3 shows the photoluminescence spectrum of a film obtained by blending a polymer according to Example 12 of the present invention with polyvinylcarbazole (number in the box represents the weight fraction of the polymer);

FIG. 7-4 shows the photoluminescence spectrum of a film obtained by blending a polymer according to Example 6 of the present invention with polymethylmethacrylate (number in the box represents the weight fraction of the polymer);

FIG. 7-5 shows the photoluminescence spectrum of a film obtained by blending a polymer according to Example 12 of the present invention with polystyrene (number in the box represents the weight fraction of the polymer);

FIG. 7-6 shows the photoluminescence spectrum of a film obtained by blending a polymer according to Example 12 of the present invention with polymethylmethacrylate (number in the box represents the weight fraction of the polymer);

FIG. 7-7 shows the photoluminescence spectrum of a film obtained by blending a polymer according to Example 6 of the present invention with epoxy (number in the box represents the weight fraction of the polymer);

FIG. 8-1 shows the voltage-current characteristics of a film obtained by blending a polymer (0.25 weight fraction) according to Example 6 of the present invention with polyvinylcarbazole;

FIG. 8-2 shows the voltage-electroluminescence characteristics of a film obtained by blending a polymer (0.25 weight fraction) according to Example 6 of the present invention with polyvinylcarbazole;

FIG. 8-3 shows the voltage-current characteristics of a film obtained by blending a polymer (0.5 weight fraction) according to Example 13 of the present invention with polyvinylcarbazole;

FIG. 8-4 shows the voltage-electroluminescence characteristics of a film obtained by blending a polymer (0.5 weight fraction) according to Example 13 of the present invention with polyvinylcarbazole;

FIG. 8-5 shows the electroluminescent spectrum of a film obtained by blending a polymer (0.2 weight fraction) according to Example 6 of the present invention with polyvinylcarbazole;

FIG. 8-6 shows the electroluminescence characteristics of a film obtained by blending a polymer (0.2 weight fraction) according to Example 7 of the present invention with polyvinylcarbazole; and FIG. 9 shows the constitution of an embodiment of the electroluminescent element using as luminescent layer the fluorene-based alternating copolymer or blend of the fluorene-based alternating copolymer and macromolecules for general use.

DETAILED DESCRIPTION OF THE INVENTION

Figure 1:
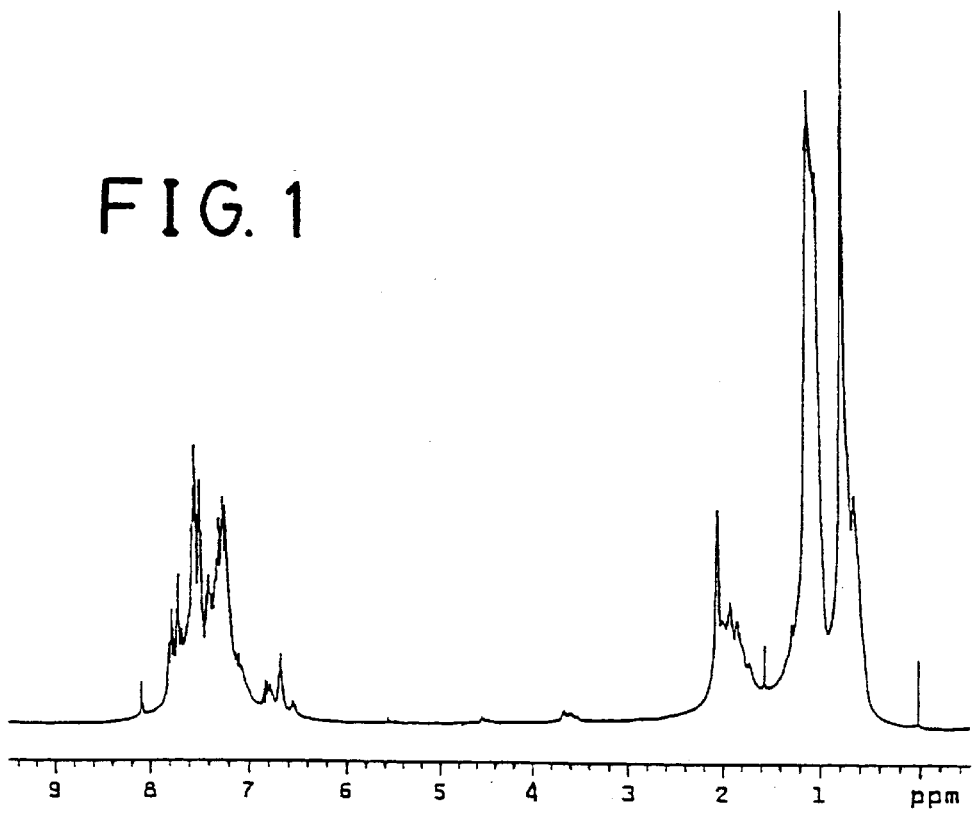
FIG. 1 shows $^1$H-NMR spectrum of a polymer according to Example 11 of the present invention.

The present inventors have created the present invention as a result of their research for manufacturing diverse kinds of macromolecular EL materials which require only a simple manufacturing method, whereby the structure of the final substance is distinct, and being well soluble in any organic solvent.

For manufacturing the macromolecular EL elements according to the present invention, fluorene-based alternating copolymers having the following formula (I) is provided for use as a light emitting material:

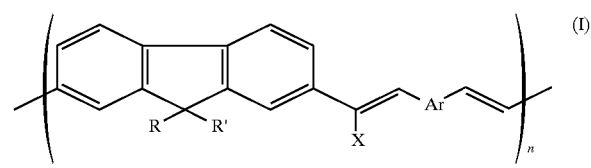

where R and R' may be identical or different, and represent a hydrogen, an aliphatic or alicyclic alkyl or alkoxy group containing 1 to 22 hydrogens or carbons, or an aryl or aryloxy group containing 6 to 18 carbons. For example, R or R' may represent hydrogen, methyl, ethyl, propyl, isopropyl, butyl, isobutyl, pentyl, hexyl, ethylhexyl, heptyl, octyl, nonyl, decyl, dodecyl, hexadecyl, octadecyl, docodecyl, cyclopropyl, cyclopentyl, cyclohexyl, ethoxy, buthoxy, hexyloxy, methoxyethoxyethyl, methoxyethoxyethoxyethyl, phenyl, phenoxy, tolyl, benzyl, naphthyl, anthracene group, etc.; X may represent hydrogen or cyano group; Ar may represent a compound substituted for aliphatic or alicyclic alkyl or an alkoxy group containing 1 to 22 carbons, phenyl groups in ortho-, meta-, para-positions, aliphatic or alicyclic alkyl or an alkoxy group containing 1 to 22 of carbons, such as dialkyl and a dialkoxyphenyl group, compounds of diphenyl, diphenylether, diphenylsulfide, and diphenylamine of various isomers, compounds having two or more phenyl groups, such as fluorene, terphenyl, naphthalene, anthracene, and derivatives thereof, compounds having hetero atoms, such as pyridine, furan, thiophene, alkylthiophene, dithiophene, pyrrole, dipyrrole, dipyrrolemethane, dibenzofuran, dibenzothiophene, diphenyloxadiazole, diphenylthiadiazole, carbazole, and derivatives thereof, compounds of diphenylmethane or diphenylsilane, and compounds of bisformylphenoxyalkanes or alkoxy of various isomers; and n represents an integer greater than or equal to 1.

For reference, the said Ar groups can be illustrated as follows:

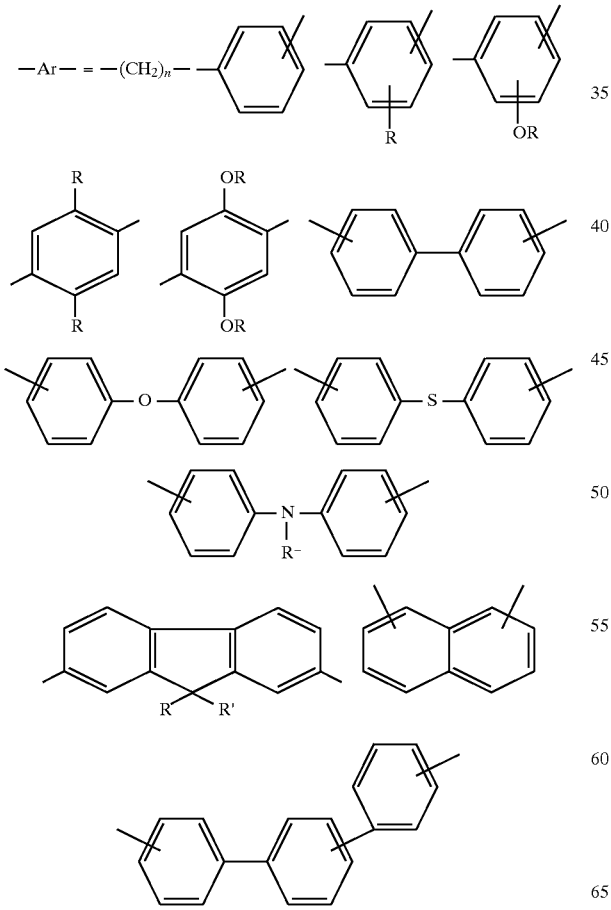

-continued

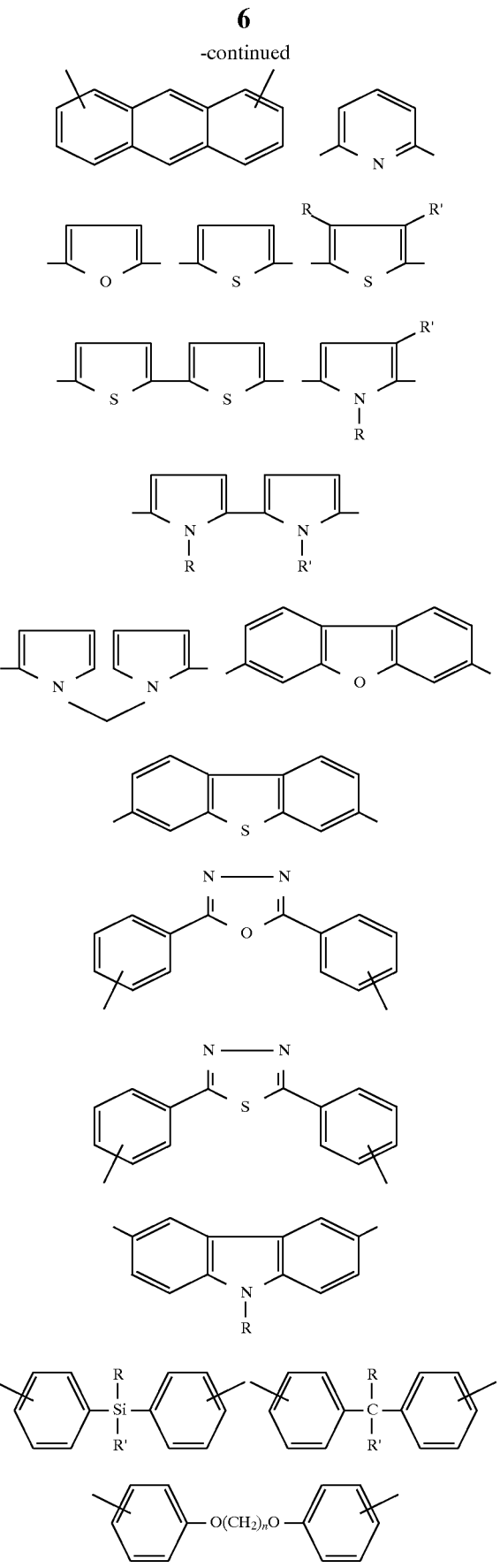

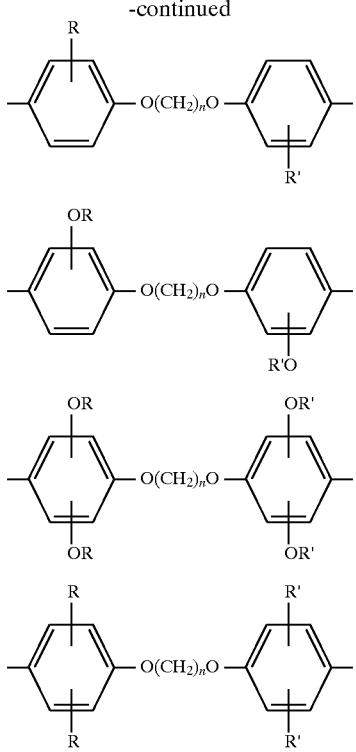

The polymerization degree and the manufacturing method of the polymers used in the present invention need not be particularly restricted. For instance, since such polymers are soluble in any organic solvent, the polymerization degree is generally 1 to 2,000, and preferably 3 to 1,000, to the extent that a film is formed by a spin coating or casting method. As examples of the manufacturing method of copolymers having conjugate double bonds, the present invention may employ known methods such as the Wittig reaction as shown in the following reaction formula (a) (J. Am. Chem. Soc., 82, p.4669, (1960), Org. React., 25, p.73, (1977)), the Knoevenagel condensation method as shown in the reaction formula (b) (J. Org. Chem., 25, p.813, (1960), Macromolecules, 27, p.3009, (1994)), the Heck reaction method by means of a palladium catalyst as shown in the reaction formula (c) (Org. React., 27, p.345, (1982) Macromolecules, 28, p.6410, (1995)), the method using a precursor as shown in the reaction formula (d) (U.S. Pat. No. 3,401,152, J. Chem. Soc., Chem.

Commun., p.32, (1992), Science, 269, p.376, (1995)), and the reaction using a strong base such as potassium-tert-butoxide as shown in the reaction formula (e) (J. Polym. Sci., Part A-1, 4, p.1337 (1966), Synth. Met., 62, p.35 (1994)).

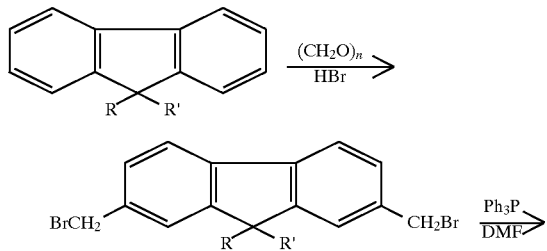

(a)

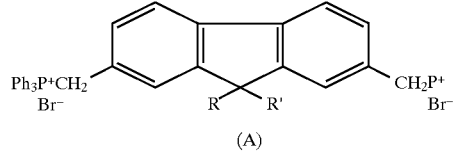

(A)

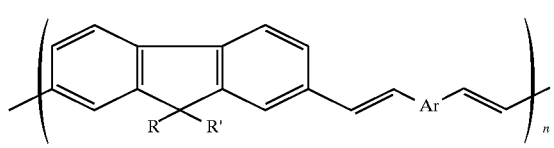

(b)

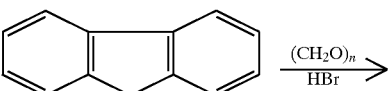

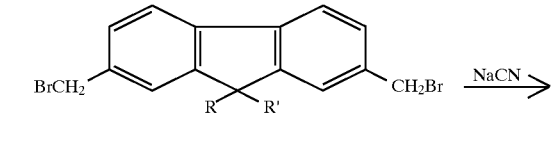

(B)

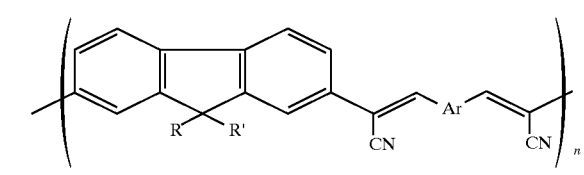

(c)

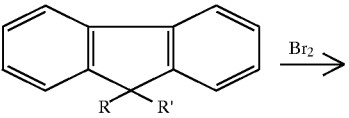

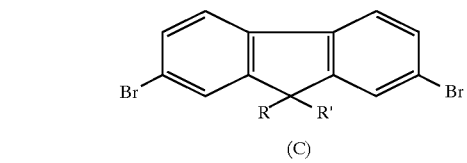

(C)

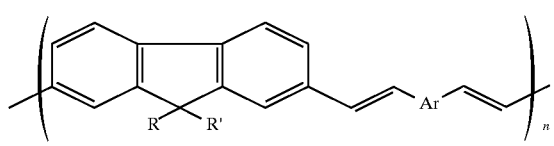

(d)

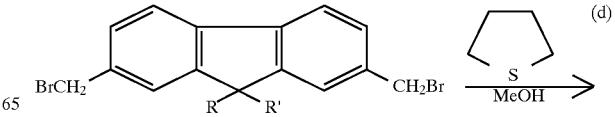

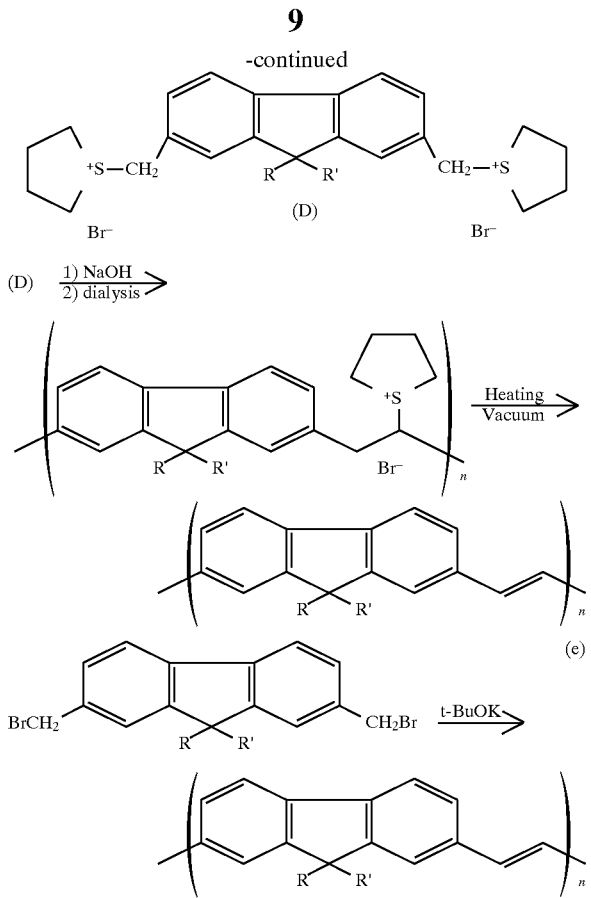

Explaining each formula in more detail, the monomers used in the Wittig polymerization are generally a phosphonium salt and dicarboxaldehyde, which are reacted with a strong basic catalyst, such as sodium or alkyl lithium using an organic solvent, such as ethanol. According to the present invention, bis-bromo(or chloro)methyl fluorene phosphonium or fluorene-substituted phosphonium, and various dicarboxaldehydes may be used, whereby all fluorene-based phosphonium salts and all aliphatic, alicyclic and aromatic dicarboxaldehydes that are capable of formulating the formula (I) after polymerization are included. Specific examples of fluorene-based phosphonium salts include phosphonium salts having an aliphatic (or alicyclic) alkyl group or an aliphatic (or alicyclic) alkoxy group having 1 to 22 carbons in place of one hydrogen at the 9 position, or phosphonium salts having an aryl or aryloxy group having 6 to 18 carbons in place of one hydrogen at the 9 position, for example, 2,7-bis(bromomethyl)fluorene triphenyl phosphonium salt or 2,7 bis(bromomethyl)-9-alkyl(alkoxy or aryl)fluorene triphenyl phosphonium salt; and phosphonium salts having an aliphatic (or alicyclic)alkyl group or an aliphatic (or alicyclic)alkoxy group having 1 to 22 carbons in place of two hydrogens at the 9 position, or phosphonium salts having an aryl or aryloxy group having 6 to 18 carbons in place of two hydrogens at the 9 position, for example, 2,7-bis(bromomethyl)-9,9'-dialkyl(alkoxy or aryl)fluorene triphenyl phosphonium salts.

Dicarboxaldehydes include, aliphatic dicarboxaldehydes such as glutaldehyde; unsubstituted aromatic discarboxaldehydes such as phthaldehyde, isophthaldehyde, and terephthaldehyde; aromatic dicarboxaldehydes having an aliphatic (or alicyclic)alkyl group or an aliphatic (or alicyclic)alkoxy group having 1 to 22 carbons, or having an aryl or aryloxy group having 6 to 18 carbons, such as 1,4-dialkyl(alkoxy or aryl)phenyl-2,5-dicarboxaldehyde; diformyl diphenyl derivatives, 2,7-diformyl fluorene derivatives, ortho- or metha- or para-terphenyl diformyl compounds, such as 2,2'- or 3,3'- or 4,4'-diphenyl dicarboxaldehyde or bis(2-or 3-or 4-formylphenyl)ether or sulfide or alkylamine; naphthalene dicarboxaldehyde compounds such as 1,8- or 2,6-naphthalen dicarboxaldehyde; anthracene dicarboxaldehyde compounds such as 1,8- or 9,10-anthracene dicarboxaldehyde; 2,6-pyridine dicarboxaldehyde, 2,5-furane dicarboxaldehyde, 2,5-thiophene dicarboxaldehyde, 5,5'-diformyl-2,2'-dithiophene, 3-alkyl-2,5-thiophene dicarboxaldehyde, 2,5-pyrrole dicarboxaldehyde, N,N'-dipyrrole methane-2,2'-dicarboxaldehyde, 2,8-dibenzofuran dicarboxaldehyde, 2,8-dibenzothiophene dicarboxaldehyde, 2,5-bis(2- or 3- or 4-formylphenyl)-1,3,4-diphenyl thiadiazole, and diformylcarbazoles substituted with aliphatic or alicyclic alkyl group having 1 to 22 carbons, such as N-alkyl-3,6-diformylcarbazole.

Monomers used in the Knoevenagel condensation method related to the present invention are bis(bromomethyl) fluorene and its derivatives and dicarboxaldehyde compounds. In lieu of bis(bromomethyl)fluorene and its derivatives, bis(cyanomethyl)fluorene and its derivatives obtained by reaction with cyanide compounds such as sodium cyanide can be used, and the dicarboxaldehyde compounds of the Wittig polymerization can also be used as is in the present invention. The polymerization is carried out by reacting these two compounds using an organic solvent such as tetrahydrofuran or toluene, in the presence of a strong basic catalyst, such as tetrabutylammonium hydroxide or potassium-tert-butoxide.

In the Heck reaction method using a palladium catalyst, or aromatic dibromide or diiodide and divinyl compounds are subject to a condensation reaction together with amine compounds such as palladium acetate, tri-o-tolylphosphine and tributylamine, in the presence of a basic solvent such as dimethylformamide. Thus, dibromide or diiodide derivatives obtained by adding brome or iodic acid to the said fluorene derivatives may be used as aromatic dibromide or diiodide compounds related to the present invention. For example, if fluorene or 9-alkyl or 9,9'-dialkyl fluorene is treated with bromine in the presence of dimethylformamide or chloroform solvent, 2,7-dibromo fluorene or an alkyl group substituted fluorene compound may be obtained. The aromatic divinyl compound may be obtained by subjecting the dicarboxaldehyde compounds such as metha-divinylbenzene, para-divinylbenzene, 2,2'- or 3,3'- or 4,4'-divinyl diphenyl, 2,5-divinyl thiophene, 2,6-divinyl naphthalene, etc. to the Wittig reaction.

In connection with the present invention, a method using a precursor can be employed to easily obtain a tetrahydrothiophene salt by reacting bis(chloro or bromomethyl) fluorene and its derivatives with tetrahydrothiophene in the presence of methanol Consequently, the bis(chloro or bromomethyl)fluorene and its derivatives used in the Wittig polymerization may be used for the reaction as is. When the thusly obtained salts are polymerized in water or methanol solvent, and then dialyzed and heated in a vacuum, the polymer of the present invention can be obtained.

The polymers related to the present invention can be easily obtained by reacting the bis(chloro or bromomethyl) fluorene and its derivatives with a strong base such as potassium-tert-butoxide or normal-butyllithium, in the presence of toluene or tetrahydrofuran solvent. Accordingly, the bis(chloro or bromomethyl)fluorene and its derivatives may be used as a monomer.

The constitution of EL elements using fluorene-based macromolecules according to the present invention, includes a general element constitution in which the material of the present invention is inserted between an anode and a cathode, that is, an element constitution of anode/luminescent layer/cathode, and also can additionally use the known hole or electron transporting layer materials (Japanese unexamined (laid-open) patent applications 2-135361, 3-152184, 6-207170) and the possible element constitutions are not particularly limited. In other words, a constitution of anode/hole transporting layer/luminescent layer/electron transporting layer/cathode would also be included. The anode ordinarily comprise a transparent supporting substrate such as glass, transparent plastics, quartz, etc. with a metal or metal oxide such as ITO, gold, copper, tin oxide, zinc oxide, etc. as electrode materials or an organic semiconductor compound such as polypyrrole, polyaniline or polythiophene coated to a thickness of 10 nanometers to 1 micrcon thereon. The cathode is usually made of a metal such as sodium, magnesium, calcium, aluminum, indium, silver, gold, copper, etc., or alloy metals thereof. The hole transporting layer can be formed by coating with polyvinylcarbazole, 2,5-bis(4'-diethylaminophenyl)-1,3,4-oxadiazole, N,N'-diphenyl-N,N'-(3-methylphenyl)-1,1'-biphenyl-4,4'-diamine(TPD), etc., while the electron transporting layer can be formed with the known compounds such as tris(8-hydroxyquinolinato)aluminum, 2-(4'-tert-butylphenyl)-5-(4"-biphenyl)-1,3,4-oxadiazole, 2,4,7-trinitro-9-fluorenone, etc., employing known film formation methods, such as vacuum deposition, spin coating, casting, LB method, etc.

The luminescent polymers of the present invention can also be used by blending with the hole or electron transporting layers or other mutually different polymers of the present invention, and existing luminescent polymers such as soluble PPV or PTh derivatives. For instance, polyvinylcarbazole, poly(1,4-hexyloxy-2,5-phenylenevinylene)poly(3-hexylthiophene), etc. and the fluorene-based macromolecules of the present invention are dissolved in an organic solvent such as chloroform and then coated by spin coating, casting method, etc. Although no particular restrictions are required, it is desirable to use the fluorene-based macromolecules of the present invention in a concentration of more than 0.001% by weight, preferably 0.1 to 50% by weight to polyvinylcarbazole, and the film in thickness of 5 nanometers to 5 microns, preferably 50 nanometers to 1 micron. Furthermore, macromolecules that are soluble in any general organic solvent and that are capable of forming into a film structure even though such macromolecules do not form a hole or electron transporting layer, may be used by blending them in the same concentration and thickness mentioned above. Macromolecules which can be used include thermoplastics, such as polymethylmethacrylate, polyarcylate, polystyrene, polycarbonate, polyvinylchloride, polyethylene, polypropylene, polyacrylonitrile, polyvinylpyrrolidone, polyvinylalcohol, polyvinylacetate, polyvinylbutyral, polyvinylamine, polycaprolacton, polyethylentherephthalate, polybutylentherephthalate, polyurethan, ABS, polysulfone, polyvinylfluoride, etc., or resins for general use, such as acetal, polyamides, polyimides, polyester, alkyd, urea, furan, nylon, melamine, phenol, silicon, epoxy, etc.

The present invention is hereinafter described in details by examples which are not limitative.

EXAMPLE

Synthesis of monomers

Monomers to be used in the present invention are not required to be particularly restricted. For example, any monomer will do as long as the polymer formed after polymerization is a macromolecule satisfying the formula (I). Even though it is not specifically mentioned in the following descriptions, compounds that can be easily synthesized in general, that are already well known or which are similar, or monomers that are commercially available were synthesized employing already known or similar methods, or purchased for manufacturing the polymers of the present invention.

Synthesis of 2,7-bis(bromomethyl)-9-normal-hexylfluorene

In a 1 L three-neck flask equipped with a stirrer, a thermometer and a reflux condenser, 50.0 g (0.2 mol) of 9-normal-hexyl fluorene, 60 g (2.0 mol) of paraformaldehyde, and 500 g of 30% HBr acetic acid solution were introduced, and reacted for 24 hours at a temperature of 60° C. When the temperature is decreased to room temperature after reaction, a soft yellow solid is obtained. This solid was filtered, washed several times with water and methanol, and then dried sufficiently in a vacuum oven at a temperature of 40° C. As a result, 74 g (yield: 85%) of a white solid having a melting point of 143° C. to 145° C. was obtained. [$^1$H-NMR(CDCl$_3$), δ 0.88 (t, 3H, CH$_3$), 1.25 (m, 8H, CH$_2$), 2.01 (m, 2H, CH$_2$), 3.98 (t, 1H, CH), 4.63 (s, 4H, CH$_2$Br), 7.39–7.72 (m, 6H, aromatics)].

Synthesis of 2,7-bis(bromomethyl)-9-normal-hexylfluorene triphenylphosphonium salt In a 1 L three-neck flask equipped with a stirrer, a thermometer and a reflux condenser, 43.6 g (0.1 mol) of 2,7-bis(bromomethyl)-9-normal-hexylfluorene, 78.7 g (0.3 mol) of triphenylphosphine, and 500 ml of dimethylformamide were introduced and reacted for 12 hours at reflux temperature. When the temperature was decreased to room temperature after reaction, and the reaction solution was dropped down slowly into a 3 L ethylether solvent being thoroughly stirred, to obtain a white solid. After filtering, this solid was washed several times with ethylether, and then dried sufficiently in a vacuum oven at a temperature of 40° C. As a result, 92.2 g (yield: 96%) of a white solid was obtained. [$^1$H-NMR (CDCl$_3$), δ 0.25(br, 3H, CH$_3$), 1.60–1.24(m, 10H, CH$_2$), 2.83(t, 1H, CH), 5.66–5.76(d, 4H, CH$_2$Br), 6.76–7.11(m, 6H, aromatic fluorenyl), 7.49–7.81 (m, 30H, aromatic)].

Synthesis of 2,7-bis(bromomethyl)-9,9'-di-normal-hexylfluorene

In a 1 L three-hole flask equipped with a stirrer, a thermometer and a reflux condenser, 33.4 g (0.1 mol) of 9,9'-di-normal-hexylfluorene, 30 g (1.0 mol) of paraformaldehyde, 300 g of 30% HBr acetic acid solution, and 120 g of 48% HBr aqueous solution were introduced and reacted for 24 hours at a temperature of 60° C. The temperature was decreased to room temperature and the resultant was diluted with 500 ml of cold water, and then extracted three times with 200 ml of dichloromethane. The extracted organic solutions were combined, and then washed consecutively with water, saturated NaHCO3 aqueous solution and salt water. The resultant organic solution was dried with anhydrous magnesium sulfate, and after filtering and evaporating the solvent, a viscous liquid was obtained. Such liquid was purified using a silica gel column (ethylacetate/hexan= 1/10 mixed solvent), and then evaporated to obtain 44.2 g (yield: 85%) of a colorless transparent viscous liquid. [$^1$H-NMR(CDCl$_3$) δ 0.59(br, 6H, CH$_3$), 0.72–1.04(m, 16H, CH$_2$), 1.95(m, 4H, CH$_2$), 4.60(s, 4H, CH$_2$Br), 7.33–7.62(m, 6H, aromatic).]

Synthesis of 2,7-bis(bromomethyl)-9,9'-di-normal-hexylfluorene triphenylphosphonium salt In a 1 L three-hole flask equipped with a stirrer, a thermometer and a reflux condenser, 26.0 g (0.05 mol) of 2,7-bis(bromomethyl)-9,9'-di-normal-hexylfluorene, 39.3 g(0.15 mol) of triphenylphosphine, and 300 ml of dimethylformamide were introduced and reacted for 12 hours at reflux temperature. After reaction, the temperature was decreased to room temperature, and the reaction solution was dropped down slowly in a 1.5 L ethylether solvent being thoroughly stirred, to obtain a white solid. After filtering, such solid was washed several times with ethylether and dried sufficiently in a vacuum oven at a temperature of 40° C. As a result, 49.6 g (yield: 95%) of a white solid was obtained. [$^1$H-NMR(CDCl$_3$), δ 0.11(br, 6H, CH$_3$), 0.62–1.09 (m, 16H, CH$_2$), 1.39(m, 4H, CH$_2$), 5.21–5.28(d, 4H CH$_2$Br), 6.83–7.27(m, 6H, fluorenyl aromatic), 7.54–7.75(m, 30H, aromatic)].

Synthesis of 2,7-bis(cyanomethyl)-9-normal-hexylflourene

Under nitrogen atmosphere, 300 ml of purified dimethylsulfoxide and 2.8 g (0.057 mol) of sodium cyanide were put in a 500 ml three-neck flask equipped with a stirrer, a thermometer and a reflux condenser, and heated at a temperature of 90° C. with agitation. When the sodium cyanide was completely dissolved, the heating was ceased, and 10 g (0.023 mol) of 2,7-bis(bromomethyl)-9-normal-hexylfluorene was added slowly. This reactant was reacted for 12 hours at a temperature of 90° C. At that time, the color of the reactant first changed into red, and then gradually became deep dark brown. After reaction, the temperature was decreased to room temperature, 500 ml of distilled water was added, the reactant was extracted three times with 200 ml of dichloromethan, the extracted organic solvents were combined, and then dried sufficiently using magnesium sulfate anhydride. After filtering such solution and evaporating the solvent, a solid of orange color was obtained. Recrystallization of such solid using ethylacetate/hexan (1:1) resulted in 5.7 g (yield: 76%) of a solid having a melting point of 130° C. to 131° C. [$^1$H-NMR (CDCl$_3$), δ 0.89(t, 3H, CH$_3$), 1.25(m, 8H, CH$_2$), 2.04(m, 2H, CH$_2$), 3.90(s, 4H, CH$_2$CN), 4.02(t, 1H, CH), 7.35–7.79(m, 6H, aromatic)].

Synthesis of 2,7-dibromo-9,9-di-normal-hexylfluorene

Under nitrogen atmosphere, 33.4 g (0.1 mol) of 9,9'-di-normal-hexylfluorene was put in a 500 ml three-neck flask equipped with a stirrer, and after dissolving it with 300 ml of purified dimethylformamide, 48 g (0.3 mol) of bromine was added slowly. This reactant was reacted for 12 hours at room temperature, added into 500 ml of water, and extracted three times with 200 ml of diethylether. The organic solvents were put together, washed consecutively with sodium thiosulfate aqueous solution and salt water, and after separating the organic layer, the resultant was dried sufficiently using magnesium sulfate anhydride. With filtering such solution and evaporating the solvent, a light yellow solid was obtained, and as a result of recrystallization with hexan, 43.8 g (yield: 89%) of a white crystal solid having a melting point of 61° C. to 62° C. was obtained. [$^1$H-NMR (CDCl$_3$), δ 0.55(br, s, 6H, CH$_3$), 0.73–1.03(m, 16H, CH$_2$), 1.90–1.94 (m, 4H, CH$_2$), 7.41–7.53(m, 6H, aromatic)].

Synthesis of 2,7-bis(bromomethyl)-9-{2-[2-(2-methoxyethoxy)ethoxy]ethyl}fluorene In a 1 L three-hole flask equipped with a stirrer, a thermometer and a reflux condenser, 31.2 g (0.1 mol) of 9-methoxyethoxyethoxyethylfluorene, 30 g (1.0 mol) of paraformaldehyde, 300 g of 30% HBr acetic acid solution, and 120 g of 48% HBr aqueous solution, were introduced and reacted for 24 hours at a temperature of 60° C. After reaction, the temperature was decreased to room temperature, and the reactant was diluted with 500 ml of cold water, and then extracted three times with 200 ml of dichloromethane. The extracted organic solutions were combined and washed consecutively with water, saturated NaHCO3 aqueous solution, and salt water. The resultant organic solution was dried with magnesium sulfate anhydride, and after filtering and evaporating the solvent, a light yellow viscous liquid was obtained. After refining the liquid using silica gel column (ethylacetate/hexan=1/4 mixed solvent), and evaporating the solvent, 39.8 g (yield: 80%) of a colorless transparent viscous liquid was obtained. [$^1$H-NMR (CDCl$_3$), δ 2.28(m, 3H, OCH$_3$), 3.41–3.71(m, 12H, OCH$_2$CH$_2$), 4.09(t, 1H, CH), 4.60(s, 4H, CH$_2$Br), 7.25–7.71(m, 6H, aromatic)].

Synthesis of 2,7-bis(bromomethyl)-9-{2-[2-(2-methoxyethoxy)ethoxy]ethyl}fluorene triphenylphosphonium salt In a 1 L three-hole flask equipped with a stirrer, a thermometer and a reflux condenser, 24.9 g (0.05 mol) of 2,7-bis(bromomethyl)-9-{2-[2-(2-methoxyethoxy)ethoxy] ethyl}fluorene, 39.3 g (0.15 mol) of triphenylphosphine, and 300 ml of dimethylformamide were introduced and reacted for 12 hours at reflux temperature. After reaction, the temperature was decreased to room temperature, and the reactant was dropped down slowly in 1.5 L of ethylether solvent under agitation, to obtain a white solid. After filtering, such extracted solid was washed several times with ethylether, and then dried sufficiently in a vacuum oven at 40° C. As a result, 48.5 g (yield: 95%) of a white solid was obtained. [$^1$H=NMR (CDCl$_3$), δ 1.22–1.41(m, 2H, CH$_2$), 2.16–2.42(br, s, 3H, OCH$_3$), 3.41–3.71(m, 10H, OCH$_2$CH$_2$), 4.18(t, 1H, CH), 5.58–5.81(d, 4H, CH$_2$Br), 6.81–7.22(m, 6H, fluoreyl aromatic), 7.27–7.84(m, 30H, aromatic)].

Synthesis of N-{2-[2-(2-methoxyethoxy)ethoxy]ethyl}-3,6-diformyl carbazole

Under nitrogen atmosphere, 191 g (2.61 mol) of dimethylformaldehyde and 100 ml of 1,2-dichloroethane were put in a 1 L three-hole flask provided with an agitator, a thermometer, and a reflux condenser, and after cooling the mixture sufficiently to the temperature of 0° C., 197.6 g (1.29 mol) of phosphorous oxychloride was dropped down slowly thereto. The temperature of the reactant was raised to room temperature, and then the reactant was agitated for 1 hour, recooled to 0° C. and 21.0 g (0.067 mol) of N-{2-[2-(2-methoxyethoxy)ethoxy]ethyl}carbazole diluted with 30 ml of 1,2-dichloroethane was added slowly thereto. After 1 hour, the reaction temperature was raised to 90° C. and the reaction was carried out for 24 hours. After reaction, the temperature was dropped to room temperature, and the reactant was diluted with 1.5 L of ice water, and then was extracted three times with 200 ml of dichloromethane. The extracted organic solutions were combined, and then washed consecutively with water, saturated NaHCO$_3$ aqueous solution, and salt water. The resultant solution was dried with anhydrous magnesium sulfate, and after filtering and evaporating the solvent, a yellow viscous liquid was obtained. Such liquid was recrystallized three times with a small amount of ethylacetate, and 11.1 g (yield: 45%) of a light yellow solid having the melting point of 108° C. to 109° C. was obtained. [$^1$H-NMR (CDCl$_3$), δ 3.48–3.56(m, 11H, OCH$_2$ and OCH$_3$), 3.98(t, 2H, OCH$_2$), 4.61(t, 2H, NCH$_2$), 7.62(d, 2H, aromatic), 8.13(d, 2H, aromatic), 8.68(s, 2H, aromatic), 10.15(s, 2H, CHO)].

Synthesis of polymers

EXAMPLE 1

Synthesis of poly(2,7-fluorendiylvinylene-alt-3,6-N-{2-[2-(2-methoxyethoxy)ethoxy]ethyl}carbazoylene vinylene)

Under nitrogen atmosphere, 1.75 g (2 mmol) of 2,7-bis(bromomethyl)fluorene triphenyl phosphonium salt and 0.75 g of N-{2-[2-(2-methoxyethoxy)ethoxy]ethyl}-3,6-diformyl carbazole were put in a 100 ml flask containing a stirrer, and after dissolving them with 60 ml of anhydrous ethanol and 20 ml of chloroform, 2.3 g of solution of anhydrous ethanol in which 5% of sodium is dissolved, was taken by an injector, and then slowly introduced dropwise in such solution. After reaction for 12 hours at room temperature, 1 ml of 0.1N aqueous hydrochloric acid solution was added thereto, and the reaction was ceased, and then a solid precipitated was filtered. The resultant solid was washed with methanol, and dried sufficiently in a vacuum oven at 40° C. As a result, 0.82 g of the title polymer as a yellow solid was obtained. The weight average molecular weight and molecular weight distribution of such polymer was obtained by using polystyrene reference substance in the presence of tetrahydrofuran, and the result was 2,700 and 1.69, respectively. [$^1$H-NMR (CDCl$_3$), δ 3.3–4.0(br, d, fluorene-CH$_2$ and carbazole-alkoxy), 4.3–4.6(br, s, NCH$_2$), 6.5–8.4(br, m, vinyl and aromatic)].

EXAMPLE 2

Synthesis of poly(9-normal-hexyl-2,7-fluorendiylvinylene-alt-3,6-N-{2-[2-(2-methoxyethoxy)ethoxy]ethyl}carbazoylene vinylene)

1.92 g (2 mmol) of 2,7-bis(bromomethyl)-9-normal-hexylfluorene triphenylphosphonium salt and 0.74 g (2 mmol) of N-{2-[2-(2-methoxyethoxy)ethoxy]ethyl}-3,6-diformyl carbazole were polymerized by the same method as in Example 1 and 0.86 g of the titled polymer as a yellow solid was obtained. The weight average molecular weight and the molecular weight distribution were 5,900 and 1.87, respectively. [$^1$H-NMR (CDCl$_3$), δ 0.6–2.2(br, m, fluorene-aliphatic), 3.4–4.0(br, d, CH and fluorene and carbazole-alkoxy), 4.3–4.6(br, s, NCH$_2$), 6.6–8.3(br, m, vinyl and aromatic)].

EXAMPLE 3

Synthesis of poly(9,9'-di-normal-hexyl-2,7-fluorenediylvinylene-alt-3,6-N-{2-[2-(2-methoxyethoxy)ethoxy]ethyl}carbazoylene vinylene)

2.09 g (2 mmol) of 2,7-bis(bromomethyl)-9,9'-di-normal-hexylfluorenetriphenyl-phosphonium salt and 0.74 g (2 mmol) of N-{2-[2-(2-methoxyethoxy)ethoxy]ethyl}-3,6-diformyl carbazole were polymerized by the same method as in Example 1, and 0.92 g of the titled polymer as yellow solid was obtained. The weight average molecular weight and the molecular weight distribution were 11,400 and 2.04, respectively. [$^1$H-NMR (CDCl$_3$), δ 0.6–2.2 (br, m, fluorene-aliphatic), 3.3–3.9(br, m, and carbazole-alkoxy), 4.3–4.6(br, s, NCH$_2$), 6.6–8.4(br, m, vinyl and aromatic)].

EXAMPLE 4

Synthesis of poly(9{-2-[2-(2-methoxyethoxy)ethoxy]ethyl}-2,7-fluorendiylvinylene-alt-3,6-N-{2-[2-(2-methoxyethoxy)ethoxy]ethyl}carbazoylene vinylene)

2.05 g (2 mmol) of 2,7-bis(bromomethyl)-9-{2-[2-(methoxyethoxy)ethoxy]ethyl}fluorene triphenylphosphonium salt and 0.74 g (2 mmol) of N-{2-[2-(2-methoxyethoxy)ethoxy]ethyl}-3,6-diformyl carbazole were polymerized by the same method as in Example 1, and 0.81 g of the titled polymer as a yellow solid was obtained. The weight average molecular weight and the molecular weight distribution were 2,900 and 1.41, respectively. [$^1$H-NMR (CDCl$_3$), δ 2.1–2.4 (br, s, fluorene-CH$_2$), 3.2–3.9(br, m, fluorene-CH and fluorene and carbazole-alkoxy), 4.3–4.6 (br, s, NCH$_2$), 6.5–8.4(br, m, vinyl and aromatic)].

EXAMPLE 5

Synthesis of poly(9-normal-hexyl-2,7-cyanofluorenylidene-3,6-N-{2-[2-(2-methoxyethoxy)ethoxy]ethyl}carbazole)

Under nitrogen atmosphere, 0.66 g (2 mmol) of 2,7-bis(cyanomethyl)-9-normal-hexyl fluorene and 0.74 g (2 mmol) of N-{2-[2-(2-methoxyethoxy)ethoxy]ethyl}-3,6-diformyl carbazole were put in a 100 ml flask equipped a stirrer, and after dissolving completely in 20 ml of purified tetrahydrofuran, it was cooled to the temperature of –78° C. 0.04 ml of tetra-normal-butylammonium hydroxide solution diluted to a degree of 1.0 mol, was taken and dropped down by a micro injector. After 30 minutes, the temperature was increased slowly up to 50° C. and the reaction was carried out for 12 hours. The reaction was ceased by putting 1 ml of 0.1 hydrochloric normal aqueous solution, and by putting the reaction solution in 250 ml of methanol, the polymer was isolated. The resultant polymer was washed well with methanol, and dried sufficiently in a vacuum oven at 40° C., and then 0.80 g of the titled polymer was obtained as a yellow solid. The weight average molecular weight and the molecular weight distribution of such polymer were weighed by using polystyrene reference substance, in the presence of tetrahydrofuran solvent, and were found to be 38,700 and 4.28, respectively. [$^1$H-NMR (CDCl$_3$), δ 0.5–2.1 (br, m, fluorene-aromatic), 3.2–4.0(br, m, fluorene-CH and fluorene and carbazole-alkoxy), 4.3–4.6(br, s, NCH$_2$), 6.5–8.2(br, m, vinyl and aromatic)].

EXAMPLE 6

Synthesis of poly(9,9'-di-normal-hexyl-2,7-fluorene diylvinylene-alt-meta-phenylene vinylene)

Under nitrogen atmosphere, 0.98 g (2 mmol) of 2,7-dibromo-9,9'-di-normal-hexylfluorene, 0.26 g (2 mmol) of meta-divinylbenzene, 18.2 mg of palladium acetate, and 124 mg of tri-ortho-tolylphosphine were put in a 100 ml flask equipped with a stirrer, and after dissolving completely in 15 ml of purified dimethylformamide, 1.4 ml of tributylamine was taken and dropped down by injector. After 30 minutes, the temperature was raised slowly to 100° C. and the reaction was carried out for 24 hours and ceased by adding 1 ml of 0.1 hydrochloric normal aqueous solution, and then the reaction solution was put slowly in 250 ml of methanol to isolate a polymer. The resultant polymer was washed well with methanol, and dried sufficiently in a vacuum oven at 40° C., and as a result, 0.81 g of the titled polymer was obtained as a yellow solid. The weight average molecular weight and the molecular weight distribution was then measured by GPC using polystyrene reference substance, in the presence of tetrahydrofuran solvent, and the result was 35,400 and 3.21, respectively. [$^1$H-NMR (CDCl$_3$), δ 0.4–2.2 (br, m, aromatic), 6.5–7.8(br, m, vinyl and aromatic).].

EXAMPLE 7

Synthesis of poly(9,9'-di-normal-hexyl-2,7-fluorenediylvinylene-alt-para-phenylen vinylene)

0.98 g (2 mmol) of 2,7-dibromo-9,9'-di-normal-hexylfluorene and 0.26 g (2 mmol) of para-divinylbenzene were polymerized by the same method as in Example 6, and 0.85 g of the titled polymer was obtained as a yellow solid. The weight average molecular weight and the molecular weight distribution were 26,300 and 2.89, respectively. [$^1$H-NMR (CDCl$_3$), δ 0.5–2.2(br, m, aliphatic), 6.5–7.8(br, m, vinyl and aromatic)].

EXAMPLE 8

Synthesis of poly(9-normal-hexyl-2,7-fluorendiylvinylenes-alt-para-phenylene vinylene 1.92 g (2 mmol) of 2,7-bis(bromomethyl)-9-normal-hexylfluorene triphenyl phosphonium salt and 0.27 g (2 mmol) of terephthalaldehyde were polymerized by the same method as in Example 1, and as a result, 0.62 g of the titled polymer was obtained as a yellow solid. The weight average molecular weight and the molecular weight distribution were 7,200 and 3.41, respectively. [$^1$H-NMR (CDCl3), δ 0.7–2.1(br, m, aromatic), 3.7–4.0(br, s, fluorene—CH), 6.5–7.8(br, m, vinyl and aromatic)].

EXAMPLE 9

Synthesis of poly(9,9'-di-normal-hexyl-2,7-fluorendiyl vinylene-alt-para-phenylene vinylene)

2.09 g (2 mmol) of 2,7-bis(bromomethyl)-9.9'-di-normal-hexylfluorenetriphenylphosphonium salt and 0.27 g (2 mmol) of terephthalaldehyde were polymerized by the same method as Example 1, and as a result, 0.68 g of the titled polymer was obtained as a yellow solid. The weight average molecular weight and the molecular weight distribution were 38,200 and 4.45, respectively. [$^1$H-NMR (CDCl$_3$), δ 0.5–2.2(br, m, aliphatic), 6.5–7.8(br, m, vinyl and aromatic)].

EXAMPLE 10

Synthesis of poly(9-normal-hexyl-2,7-fluorendiylvinylene-alt-meta-phenylene vinylene)

1.92 g (2 mmol) of 2,7-bis(bromomethyl)-9-normal-hexylfluorene triphenylphosphonium salt and 0.27 g (2 mmol) of isophthalaldehyde were polymerized by the same method as in Example 1, and as a result, 0.64 g of the titled polymer was obtained as a pale yellow solid. The weight average moleculer weight and the molecular weight distribution were 12,700 and 5.01, respectively. [$^1$H-NMR (CDCl$_3$), δ 0.6–2.2(br, m, aromatic), 3.6–4.0(br, s, fluorene—CH), 6.4–7.8(br, m, vinyl and aromatic)].

EXAMPLE 11

Synthesis of poly(9,9'-di-normal-hexyl-2,7-fluorendiylvinylene-alt-meta-phenylene)

2.09 g (2 mmol) of 2,7-bis(bromomethyl)-9,9'-di-normal-hexylfluorentriphenyl phosphonium salt and 0.27 g (2 mmol) of isophthalaldehyde were polymerized by the same method as in Example 1, and as a result, 0.69 g of the titled polymer was obtained as a pale yellow solid. The weight average molecular weight and the molecular weight distribution were 43,500 and 4.12, respectively. [$^1$H-NMR (CDCl$_3$), δ 0.4–2.2(br, m, aliphatic), 6.5–7.8(br, m, vinyl and aromatic)].

EXAMPLE 12

Synthesis of poly(9-normal-hexyl-2,7-fluorendiylvinylene-alt-2,6-pyridinylene vinylene)

1.92 g (2 mmol) of 2,7-bis(bromomethyl)-9-normal-hexylfluorene triphenyl phosphonium salt and 0.27 g (2 mmol) of 2,6-pyridinedicarboxaldehyde were polymerized by the same method as Example 1, and as a result, 0.66 g of the titled polymer was obtained as yellow solid. The weight average molecular weight and the molecular weight distribution were 20,800 and 5.10, respectively. [$^1$H-NMR (CDCl$_3$), δ 0.7–2.2(br, m, aliphatic), 3.7–3.9(br, s, fluorene-CH), 6.6–7.8(br, m, vinyl and aromatic)].

EXAMPLE 13

Synthesis of poly(9.9'-di-normal-hexyl-2,7-fluorenediylvinylene-alt-2,6-pyridinylene-vinylene)

2.09 g (2 mmol) of 2,7-bis(bromomethyl)-9.9'-di-normal-hexyl-fluorene triphenyl phosphonium salt and 0.27 g (2 mmol) of 2,6-pyridinedicarboxaldehyde were polymerized by the same method as in Example 1, and as a result, 0.68 g of the titled polymer was obtained as a light yellow solid. The weight average molecular weight and the molecular weight distribution were 35,700 and 3.33, respectively. [$^1$H-NMR (CDCl$_3$), δ 0.4–2.2(br, m, aliphatic), 6.6–7.8(br, m, vinyl and aromatic)].

EXAMPLE 14

Synthesis of poly[(9-normal-hexyl-2,7-fluorenediylvinylene-alt-2,2'-(N,N'-dipyrrolemethanylene vinylene)]

1.92 g (2 mmol) of 2,7-bis(bromomethyl)-9-normal-hexylfluorene triphenyl phosphonium salt and 0.40 g (2 mmol) of N,N'-dipyrrolemethane-2,2'-dicarboxaldehyde were polymerized by the same method as in Example 1, and as a result, 0.78 g of the titled polymer was obtained as a yellow solid. The weight average molecular weight and the molecular weight distribution were 3,500 and 1.75, respectively. [$^1$H-NMR (CDCl$_3$), δ 0.7–2.0(br, m, aliphatic), 3.6–3.8(br, s, fluorene-CH), 5.4–5.8(br, d, pyrrole-CH), 6.0–7.8(br, m, vinyl and aromatic)].

EXAMPLE 15

Synthesis of poly(9,9'-di-normal-hexyl-2,7-fluorenediylvinylene-alt-2,2'-(N,N'-dipyrrolemethaneylene vinylene)

2.09 g (2 mmol) of 2,7-bis(bromomethyl)-9,9'-di-normal-hexylfluorene triphenylphosphonium salt and 0.40 g (2 mmol) of N,N'-dipyrrolemethan-2,2'-dicarboxaldehyde were polymerized by the same method as in Example 1, and as a result, 0.85 g of the titled polymer was obtained as a yellow solid. The weight average molecular weight and the molecular weight distribution were 8,100 and 2.03, respectively. [$^1$H-NMR (CDCl$_3$), δ 0.4–2.1(br, m, aliphatic), 5.5–5.8(br, d, pyrrole-CH$_2$), 6.1–7.8(br, m, vinyl and aromatic)].

EXAMPLE 16

Synthesis of poly(9-normal-hexyl-2,7-fluorenediylvinylene-alt-2,5-furanylene vinylene)

1.92 g (2 mmol) of 2,7-bis(bromomethyl)-9-normal-hexylfluorene triphenylphosphonium salt and 0.25 g (2 mmol) of 2,5-furandicarboxaldehyde were polymerized by the same method as in Example 1, and as a result, 0.62 g of the titled polymer was obtained as an orange-colored solid. The weight average molecular weight and the molecular weight distribution were 20,200 and 4.35, respectively. [$^1$H-NMR (CDCl$_3$), δ 0.6–2.2(br, m, aliphatic), 3.8–4.0(br, s, fluorene-CH), 6.2–7.8(br, m, vinyl and aromatic)].

EXAMPLE 17

Synthesis of poly(9,9'-di-normal-hexyl-2,7-fluorenediylvinylene-alt-2,5-furanylene vinylene)

2.09 g (2 mmol) of 2,7-bis(bromomethyl)-9,9'-di-normal-hexylfluorene triphenylphosphonium salt and 0.25 g (2 mmol) of 2,5-furandicarboxaldehyde were polymerized by the same method as in Example 1, and as a result, 0.58 g of the titled polymer was obtained as a dark yellow solid. The weight average molecular weight and the molecular weight distribution were 9,600 and 1.78, respectively. [$^1$H-NMR (CDCl$_3$), δ 0.5–2.1(br, m, aliphatic), 6.2–7.8(br, m, vinyl and aromatic)].

EXAMPLE 18

Synthesis of poly(9-n-hexyl-2,7-fluorenediylvinylene-alt-2,5-thiophenylene vinylene)

1.92 g (2 mmol) of 2,7-bis(bromomethyl)-9-normal-hexylfluorene triphenyl phosphonium salt and 0.28 g (2 mmol) of 2,5-thiophendicarboxaldehyde were polymerized by the same method as in Example 1, and as a result, 0.62 g of the titled polymer was obtained as a dark orange colored solid. The weight average molecular weight and the molecular weight distribution were 9,300 and 3.89, respectively. [$^1$H-NMR (CDCl$_3$), δ 0.6–2.2(br, m, aliphatic), 3.7–4.0(br, s, fluorene-CH), 6.4–7.8(br, m, vinyl and aromatic)].

EXAMPLE 19

Synthesis of poly(9,9'-di-normal-hexyl-2,7-fluorenediylvinylene-alt-2,5-thiophenylene vinylene)

2.09 g (2 mmol) of 2,7-bis(bromomethyl)-9,9'-di-normal-hexylfluorene triphenylphosphonium salt and 0.28 g (2 mmol) of 2,5-thiophenedicarboxaldehyde were polymerized by the same method as in Example 1, and as a result, 0.68 g of the titled polymer was obtained as a dark yellow solid. The weight average molecular weight and the molecular weight distribution were 5,600 and 1.73, respectively. [$^1$H-NMR (CDCl$_3$), δ 0.3–2.1(br, m, aliphatic), 6.4–7.7(br, m, vinyl and aromatic)].

EXAMPLE 20

Synthesis of poly(9-normal-hexyl-2,7-fluorenediylvinylene-alt-3-hexyl-2,5-thiophenylene vinylene)

1.75 g (2 mmol) of 2,7-bis(bromomethyl)fluorene triphenylphosphonium salt and 0.45 g (2 mmol) of 3-hexyl-2,5-thiophenedicarboxaldehyde were polymerized by the same method as in Example 1, and as a result, 0.58 g of the titled polymer was obtained as a red solid. The weight average molecular weight and the molecular weight distribution were 8,600 and 3.43, respectively. [$^1$H-NMR (CDCl$_3$), δ 0.8–1.8(br, m, aliphatic), 2.4–2.7(br, s, thiophene-CH$_2$), 3.7–4.0(br, s, fluorene-CH$_2$), 6.4–7.8(br, m, aromatic)].

EXAMPLE 21

Synthesis of poly(9,9'-di-normal-hexyl-2,7-fluorenediylvinylene-alt-3-hexyl-2,5-thiopheneylene vinylene)

2.09 g (2 mmol) of 2,7-bis(bromomethyl)-9,9'-di-normal-hexylfluorene triphenylphosphonium salt and 0.45 g (2 mmol) of 3-hexyl-2,5-thiophenedicarboxaldehyde were polymerized by the same method as in Example 1, and as a result, 0.64 g of the titled polymer was obtained as a red solid. The weight average molecular weight and the molecular weight distribution were 8,200 and 1.95, respectively. [$^1$H-NMR (CDCl$_3$), δ 0.6–3.0(br, m, aliphatic), 6.5–7.8(br, m, vinyl and aromatic)].

EXAMPLE 22

Synthesis of poly(9,9'-di-normal-hexyl-2,7-fluorenediylvinylene-alt-5,5'-dithiophenylene vinylene)

2.09 g (2 mmol) of 2,7-bis(bromomethyl)-9,9'-di-normal-hexylfluorene triphenylphosphonium salt and 0.44 g (2 mmol) of 2,2'-dithiophene-5,5'-dicarboxaldehyde were polymerized by the same method as in Example 1, and as a result, 0.62 g of the titled polymer was obtained as a red solid. The weight average molecular weight and the molecular weight distribution were 14,600 and 2,52, respectively. [$^1$H-NMR (CDCl$_3$), δ 0.6–2.2(br, m, aliphatic), 6.6–7.8(br, m, vinyl and aromatic)].

Example 23

Synthesis of poly(9,9'-di-normal-hexyl-2,7-fluorenediylvinylene-alt-1,4-di-normal-hexyloxy-2,5-phenylene vinylene)

2.09 g (2 mmol) of 2,7-bis(bromomethyl)-9,9'-di-normal-hexylfluorene triphenylphosphonium salt and 0.66 g (2 mmol) of 1,4-di-normal-hexyloxyphenylene-2,5-dicarboxaldehyde were polymerized by the same method as in Example 1, and as a result, 0.98 g of the titled polymer was obtained as an orange-colored solid. The weight average molecular weight and the molecular weight distribution were 13,500 and 3.05, respectively. [$^1$H-NMR (CDCl$_3$), δ 0.4–2.2(br, m, aliphatic), 4.0–4.3(br, s, OCH$_2$), 6.7–7.8(br, m, vinyl and aromatic)].

EXAMPLE 24

Synthesis of poly(9,9'-di-normal-hexyl-2,7-fluorenediylvinylene-2,2'-diphenyletherylene vinylene)

2.09 g (2 mmol) of 2,7-bis(bromomethyl)-9,9'-di-normal-hexylfluorene triphenylphosphonium salt and 0.45 g (2 mmol) of bis(2-formylphenyl)ether were polymerized by the same method as in Example 1, and as a result, 0.68 g of the titled polymer was obtained as a pale yellow solid. The weight average moleculer weight and the molecular weight distribution were 18,500 and 3.52, respectively. [$^1$H-NMR (CDCl$_3$), δ 0.5–2.1(br, m, aliphatic), 6.7–7.9(br, m, vinyl and aromatic)].

EXAMPLE 25

Synthesis of poly(9,9'-di-normal-hexyl-2,7-fluorenediylvinylene-alt-4,4'-{2,21'-dimethoxy-1,1'-(hexamethylene-1,6-dyloxy)}diphenylene vinylene)

2.09 g (2 mmol) of 2,7-bis(bromomethyl)-9,9'-di-normal-hexylfluorene triphenylphosphonium salt and 0.77 g (2 mmol) of 1,6-bis(4-formyl-2-methoxyphenoxy)hexane were polymerized by the same method as in Example 1, and as a result, 1.08 g of the titled polymer was obtained as a yellow-green solid. The weight average molecular weight and the molecular weight distribution were 8,200 and 2,51, respectively. [$^1$H-NMR (CDCl$_3$), δ 0.3–2.1(br, m, aliphatic), 3.6–4.2(br, m, OCH$_2$), 6.4–7.7(br, m, vinyl and aromatic)].

EXAMPLE 26

Synthesis of poly(9,9'-di-normal-hexyl-2,7-fluorenediylvinylene-alt-2,2'-(1,1'-(hexamethylene-1,6-diyloxy)}diphenylene vinylene)

2.09 g (2 mmol) of 2,7-bis(bromomethyl)-9,9'-di-normal-hexylfluorene triphenylphosphonium salt and 0.65 g (2 mmol) of 1,6-bis(2-formylphenoxy)hexane were polymerized by the same method as in Example 1, and as a result, 0.85 g of the titled polymer was obtained as an apricot-colored solid. The weight average molecular weight and the molecular weight distribution were 4,500 and 1.79, respectively. [$^1$H-NMR (CDCl$_3$), δ 0.4–2.0(br, m, aliphatic), 3.9–4.1(br, s, OCH$_2$), 6.6–7.7(br, m, vinyl and aromatic)].

EXAMPLE 27

Synthesis of poly(9,9'-di-normal-hexyl-2,7-fluorenediylvinylene-alt-3,31'-{1,1'-(hexamethylene-1,6-diyloxy)}diphenylene vinylene)

Polymerization of 2,7-bis(bromomethyl)-9,9'-di-normal-hexylfluorene triphenyl phosphonium salt and 1,6-bis(3-formylphenoxy)hexane 2.09 g (2 mmol) of 2,7-bis(bromomethyl)-9,9'-di-normal-hexylfluorenetriphenyl phosphonium salt and 0.65 g (2 mmol) of 1,6-bis(3-formylphenoxy)hexan were polymerized by the same method as in Example 1, and as a result, 0.88 g of the titled polymer was obtained as a light yellow solid. The weight average molecular weight and the molecular weight distribution were 9,800 and 2.23, respectively. [$^1$H-NMR (CDCl$_3$), δ 0.4–2.0(br, m aliphatic), 3.9–4.1(br, s, OCH$_2$), 6.5–7.7(br, m, vinyl and aromatic)].

EXAMPLE 28

Synthesis of poly(9,9'-di-normal-hexyl-2,7-fluorenediyl vinylene-alt-4,4'-{1,1'-(hexamethylene-1,6-diyloxy)}diphenylene vinylene)

2.09 g (2 mmol) of 2,7-bis(bromomethyl)-9,9'-di-normal-hexylfluorene triphenylphosphonium salt and 0.65 g (2 mmol) of 1,6-bis(4-formylphenoxy)hexane were polymerized by the same method as in Example 1, and as a result, 0.86 g of the titled polymer was obtained as a yellow solid. The weight average molecular weight and the molecular weight distribution were 6,800 and 1,68, respectively. [$^1$H-NMR (CDCl$_3$), δ 0.4–2.1(br, m, aliphatic), 3.8–4.1(br, s, OCH$_2$), 6.6–7.7(br, m, vinyl and aromatic)].

Figure 2:
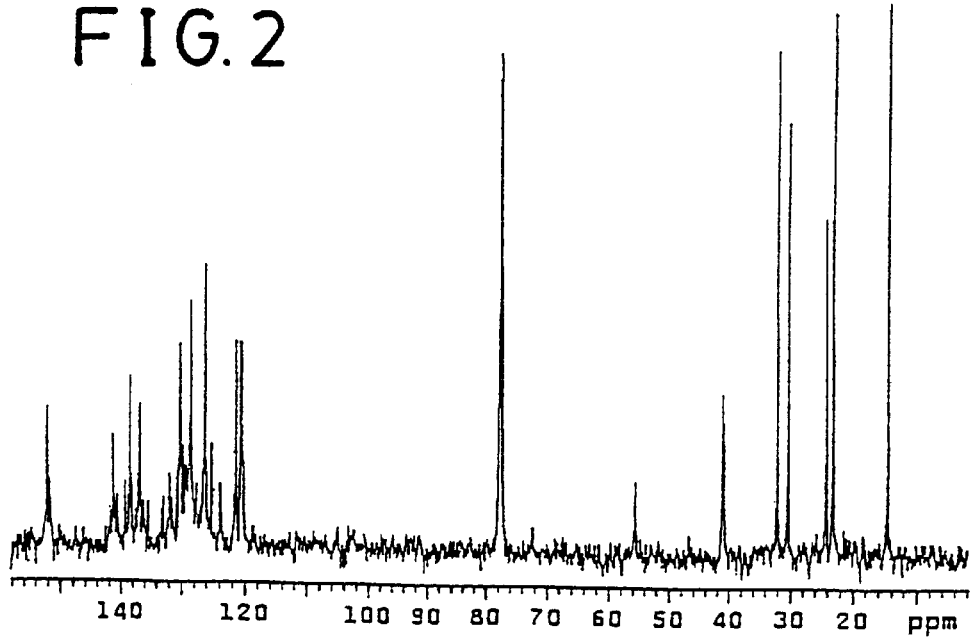
FIG. 2 shows $^{13}$C-NMR spectrum of a polymer according to Example 11 of the present invention.

The structures of polymers manufactured according to the Examples are shown in the following Table 1, and the nuclear magnetic resonance spectra of the proton and carbon-13 manufactured according to Example 11, are shown in FIGS. 1 and 2, respectively.

TABLE 1

Chemical Structures of Polymers

| Ex | Structures of Polymers | Remarks |
|---|---|---|
| 1 | | R = 2-[2-(methoxy ethoxy)ethoxy]ethyl |
| 2 | | R1 = hexyl<br>R2 = [2-(2-methoxy ethoxy)ethoxy]ethyl |
| 3 | | R1 = R2 = hexyl<br>R3 = 2-[2-(2-methoxy ethoxy)ethoxy]ethyl |

TABLE 1-continued
Chemical Structures of Polymers
| Ex | Structures of Polymers | Remarks |
|---|---|---|
| 4 | 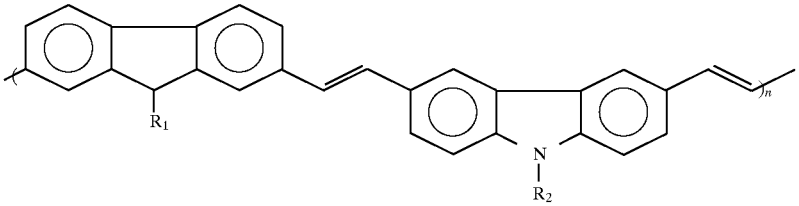 | R1 = R2 = 2-[2-(2-methoxy ethoxy)ethoxy]ethyl |
| 5 | 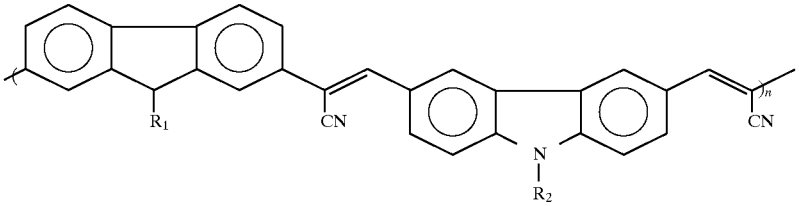 | R1 = hexyl<br>R2 = 2-[2-(2-methoxy ethoxy]ethyl |
| 6 | 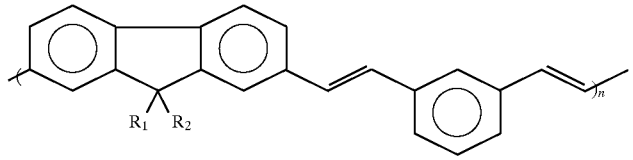 | R1 = R2 = hexyl |
| 7 | 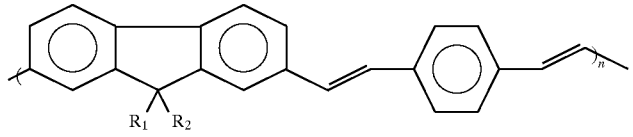 | R1 = R2 = hexyl |
| 8 | 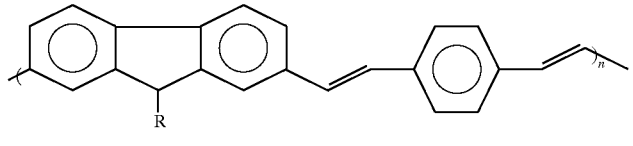 | R = hexyl |
| 9 | 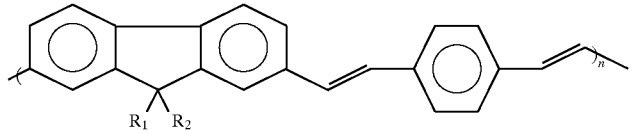 | R1 = R2 = hexyl |
| 10 | 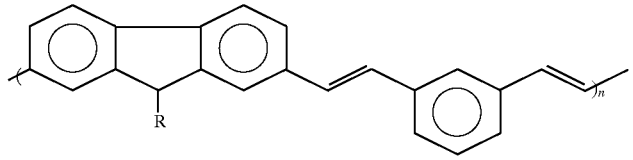 | R = hexyl |
| 11 | 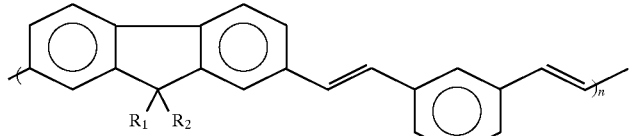 | R1 = R2 = hexyl |
| 12 | 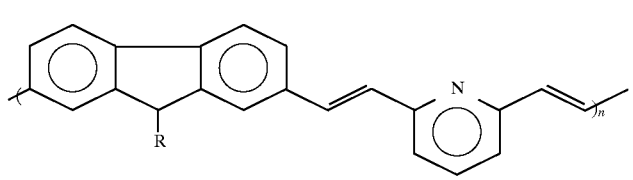 | R = hexyl |

TABLE 1-continued
Chemical Structures of Polymers
| Ex | Structures of Polymers | Remarks |
|---|---|---|
| 13 | 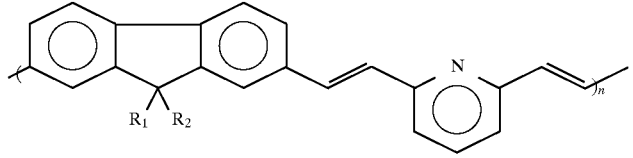 | R1 = R2 = hexyl |
| 14 | 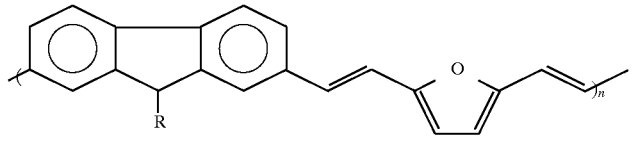 | R = hexyl |
| 15 | 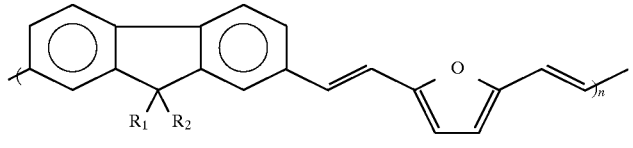 | R1 = R2 = hexyl |
| 16 | 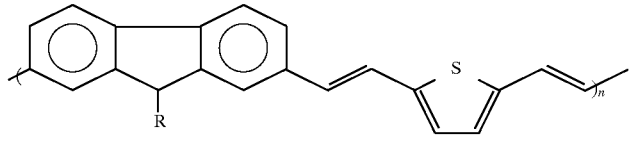 | R = hexyl |
| 17 | 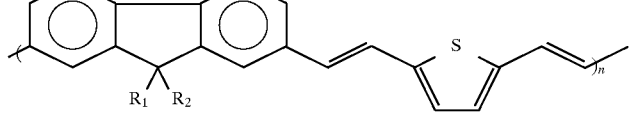 | R1 = R2 = hexyl |
| 18 | 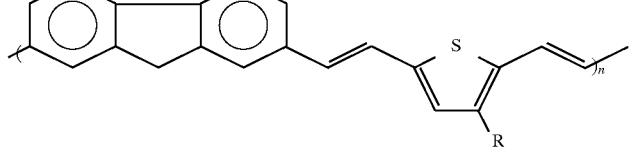 | R = hexyl |
| 19 | 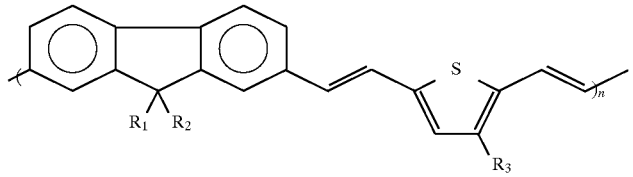 | R1 = R2 = hexyl |
| 20 |  | R = hexyl |
| 21 |  | R1 = R2 = R3 = hexyl |

TABLE 1-continued

Chemical Structures of Polymers

| Ex | Structures of Polymers | Remarks |
|---|---|---|
| 22 | | R1 = R2 = hexyl |
| 23 | | R1 = R2 = R3 = R4 = hexyl |
| 24 | | R1 = R2 = hexyl |
| 25 | | R1 = R2 = hexyl |
| 26 | | R1 = R2 = hexyl |
| 27 | | R1 = R2 = hexyl |
| 28 | | R1 = R2 = hexyl |

Ultraviolet (UV), photoluminescence (PL) and electroluminescence (EL) characteristics and manufacture of EL elements.

The UV, PL and EL spectra were obtained from thin films using the thusly manufactured polymers, and EL elements were also formed, and studies on the characteristics thereof were conducted. Such thin film was formed by dissolving 0.1 g of the polymer in 5 ml of chloroform solution, refining it using a 0.2 micron filter, and then spin coating it, with the spin speed controlled appropriately to make the thickness of such film be 100 nanometers (ordinarily 900–1200 rpm).

After drying the coated sample at room temperature, the UV spectrum was first obtained, and then the PL spectrum was obtained using the maximum value of the UV peak. The obtained results are summarized in the following Table 2:

TABLE 2

Characteristics of Polymers manufactured according to Examples

| Ex. | UV ($\lambda_{max}$ nm) | PL ($\lambda_{max}$ nm) | $T_{deg}$* (°C.) |
|---|---|---|---|
| 1 | 406 | 470,492 | 212.1 |
| 2 | 408 | 470 | 216.5 |
| 3 | 408 | 466 | 216.8 |
| 5 | 420 | 558,496 | 314.9 |
| 6 | 382 | 428,448 | 414.4 |
| 7 | 412 | 480 | 420.1 |
| 8 | 406 | 490,564 | 414.0 |
| 10 | 368 | 453 | 405.7 |
| 12 | 386 | 551 | 411.8 |
| 13 | 388 | 495,530 | 421.8 |
| 14 | 392 | 466 | 378.2 |
| 15 | 398 | 467 | 403.8 |
| 23 | 444 | 509,547 | 383.1 |
| 24 | 368 | 425,445 | 410.4 |
| 25 | 388 | 458 | 397.8 |
| 26 | 374 | 429,449 | 408.9 |
| 27 | 380 | 420,441 | 416.9 |
| 28 | 386 | 447 | 410.0 |

As shown in Table 2, it seems that the said polymers emit light of various color tones depending on the kinds of polymer, considering the fact that such polymers show the PL peak maximum values (420–564 nanometers) in a broad area. The actual spectra thereof are shown in FIGS. 3-1 to 3-21.

Figures 1, 3:
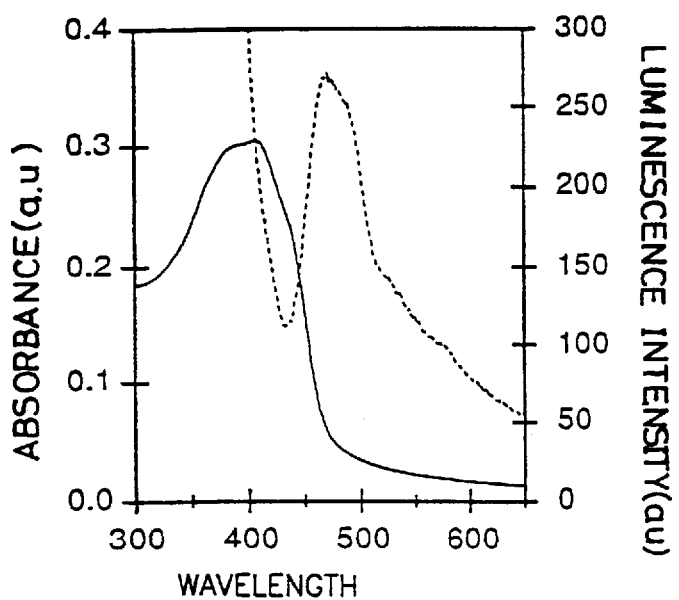
Figures 2, 3:
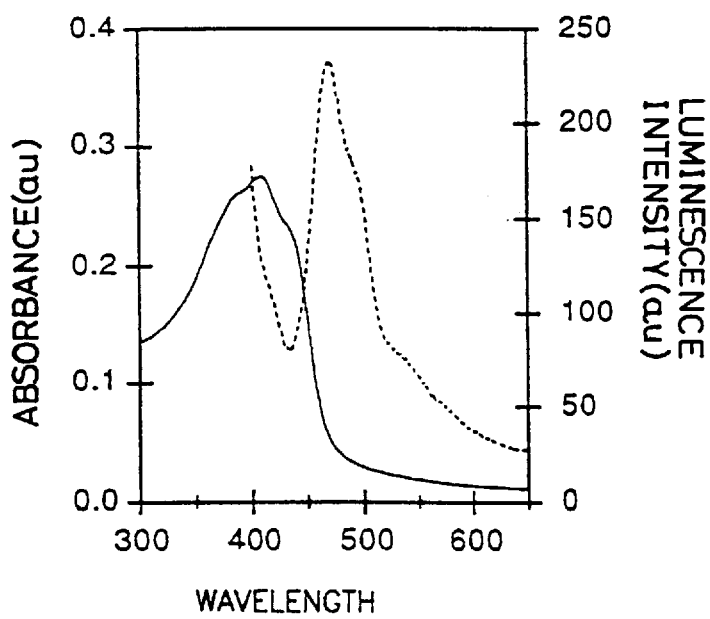
Figure 3:
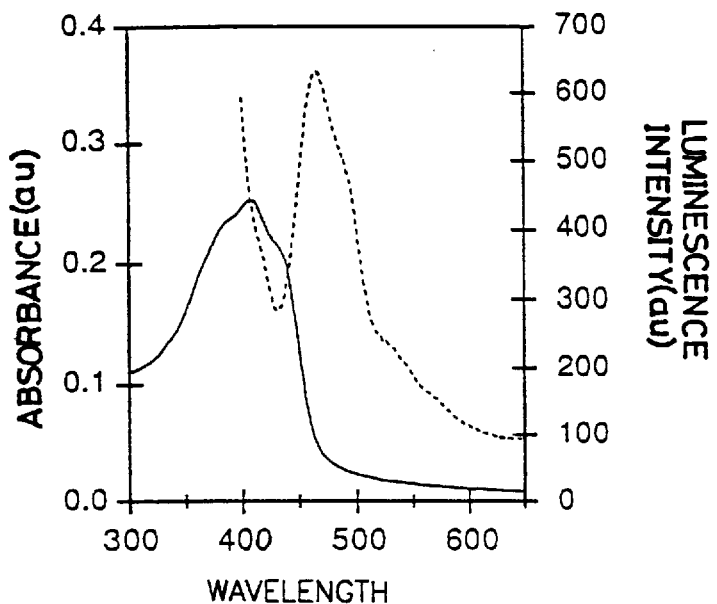
Figures 3, 4:
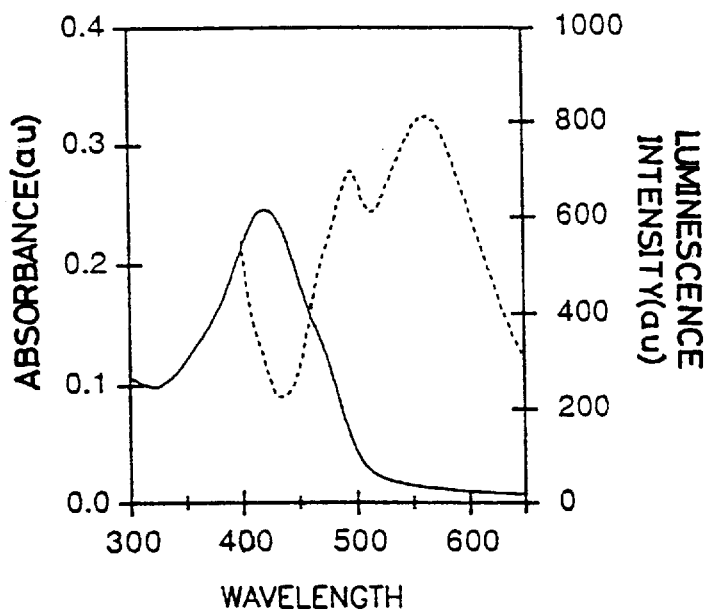
Figures 3, 4, 5:
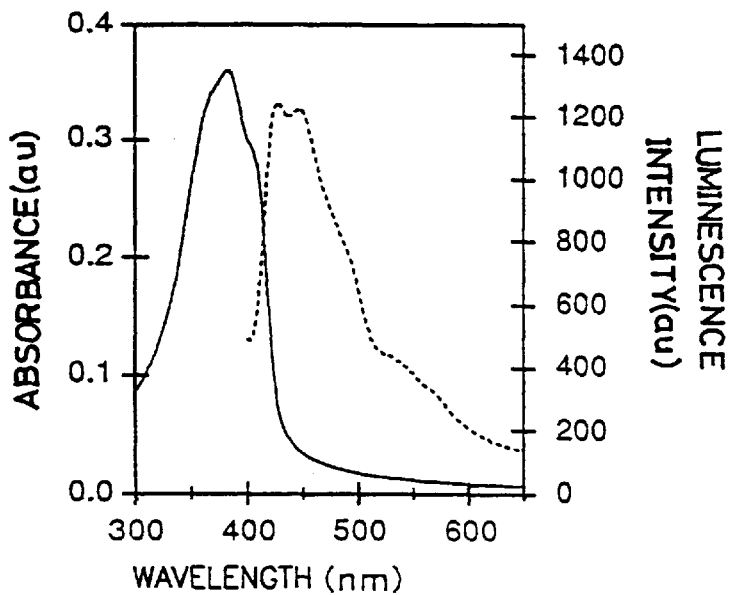
Figures 3, 4, 5, 6:
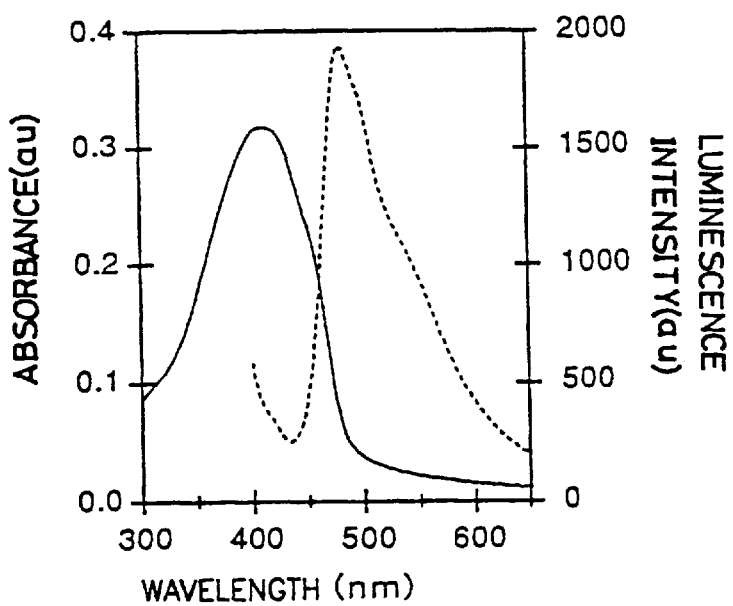
Figures 3, 4, 5, 6, 7:
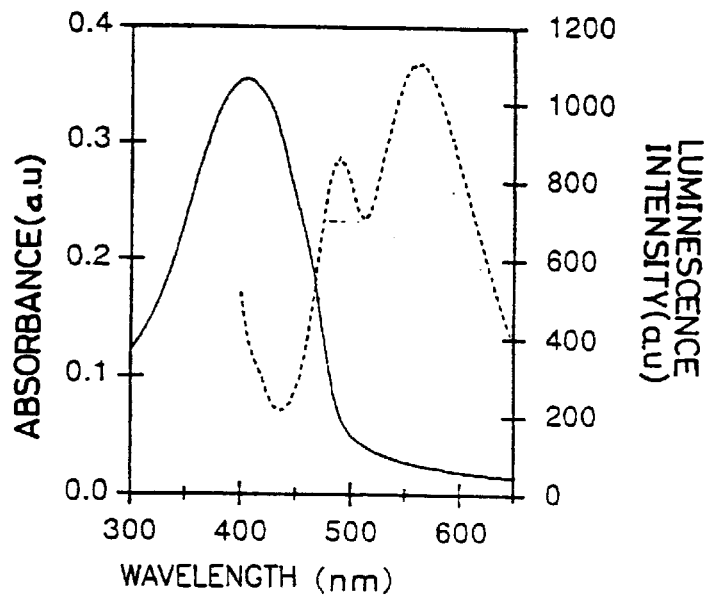
Figures 3, 4, 5, 6, 7, 8:
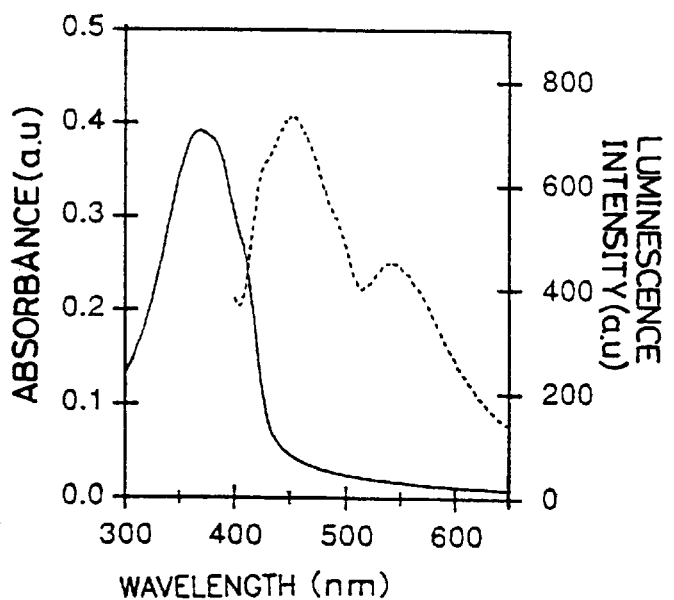
Figures 3, 4, 5, 6, 7, 8, 9:
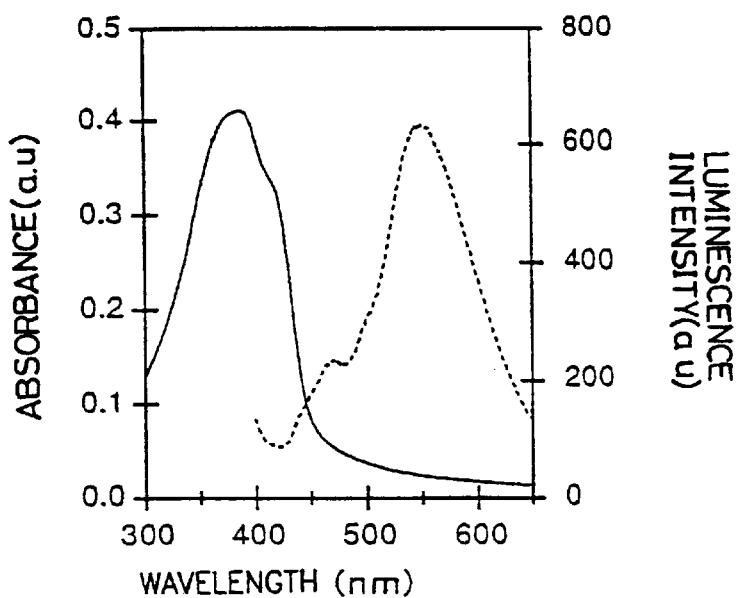
Figures 3, 4, 5, 6, 7, 8, 9, 10:
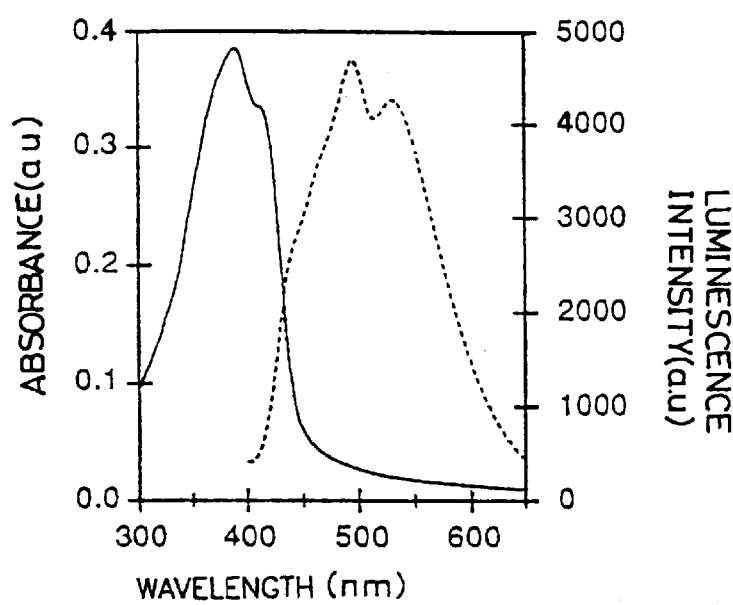
Figures 3, 4, 5, 6, 7, 8, 9, 10, 11:
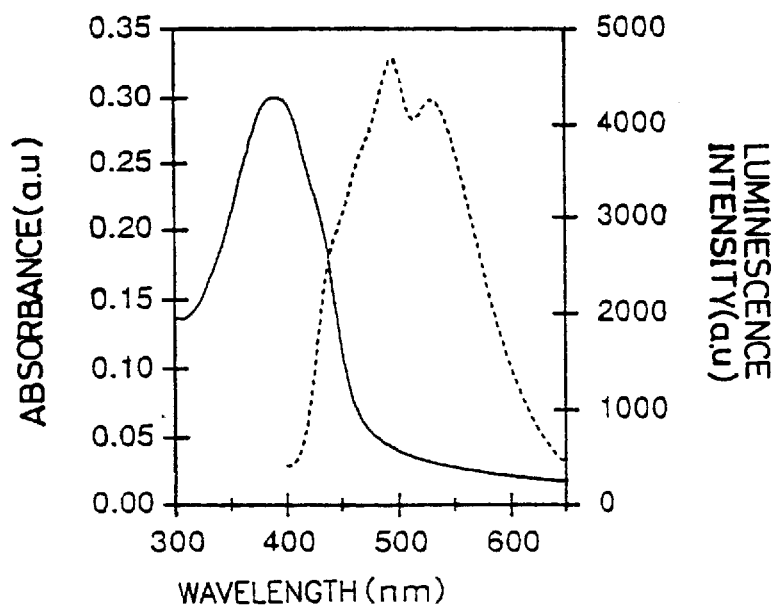
Figures 3, 4, 5, 6, 7, 8, 9, 10, 11, 12:
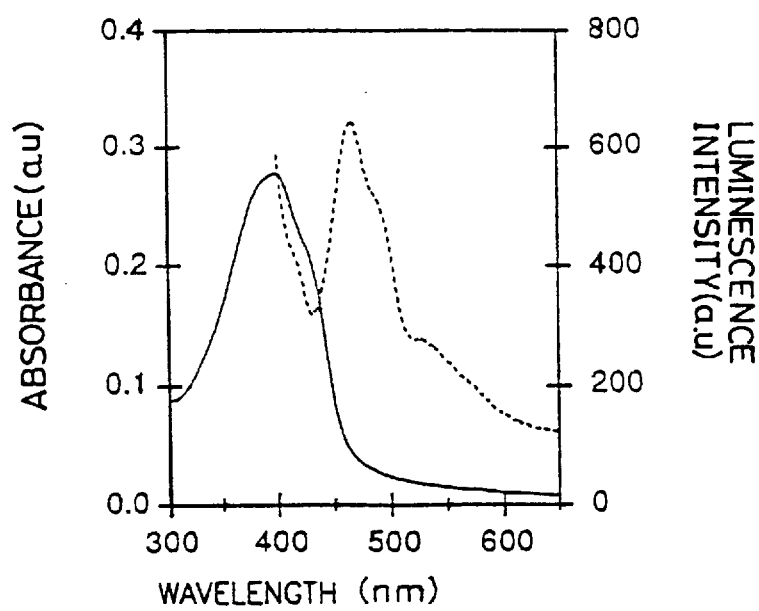
Figures 3, 4, 5, 6, 7, 8, 9, 10, 11, 12, 13:
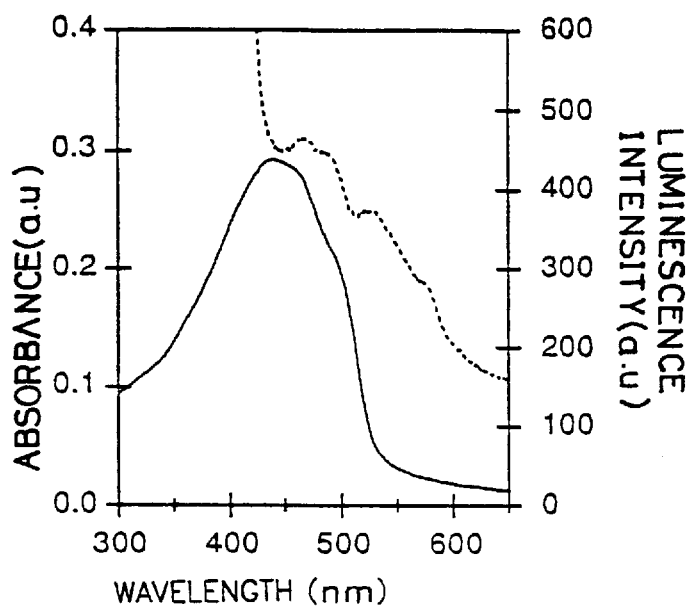
Figures 3, 4, 5, 6, 7, 8, 9, 10, 11, 12, 13, 14:
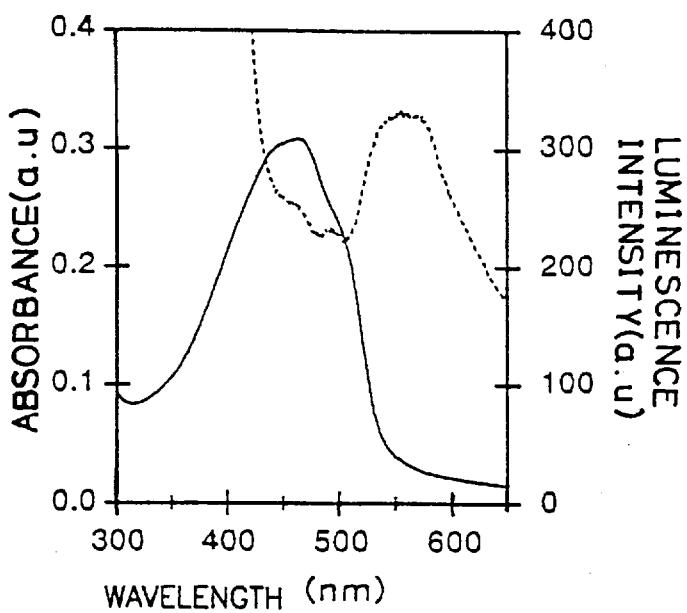
Figures 3, 4, 5, 6, 7, 8, 9, 10, 11, 12, 13, 14, 15:
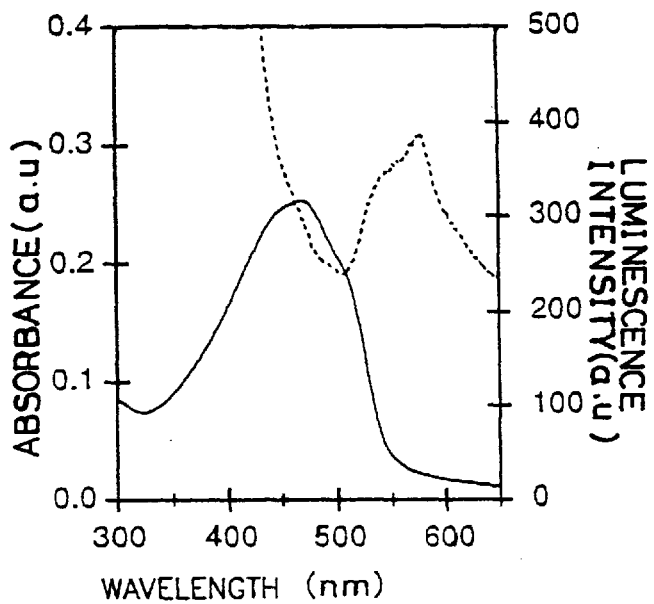
Figures 3, 4, 5, 6, 7, 8, 9, 10, 11, 12, 13, 14, 15, 16:
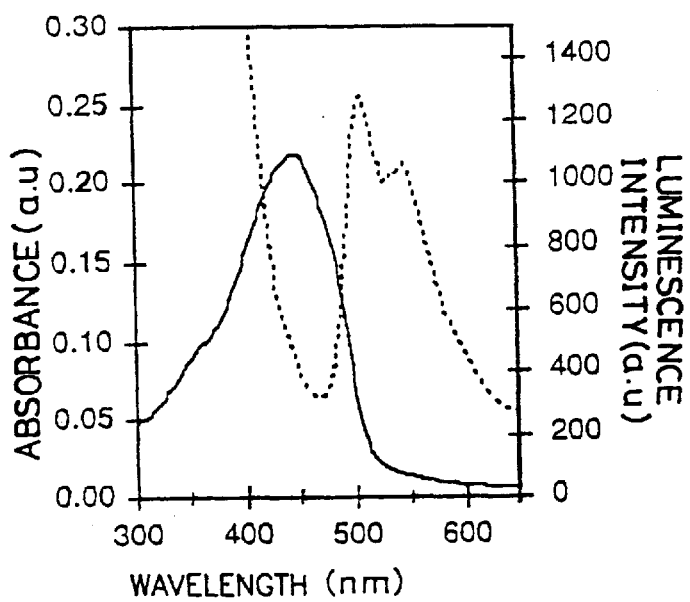
Figures 3, 4, 5, 6, 7, 8, 9, 10, 11, 12, 13, 14, 15, 16, 17:
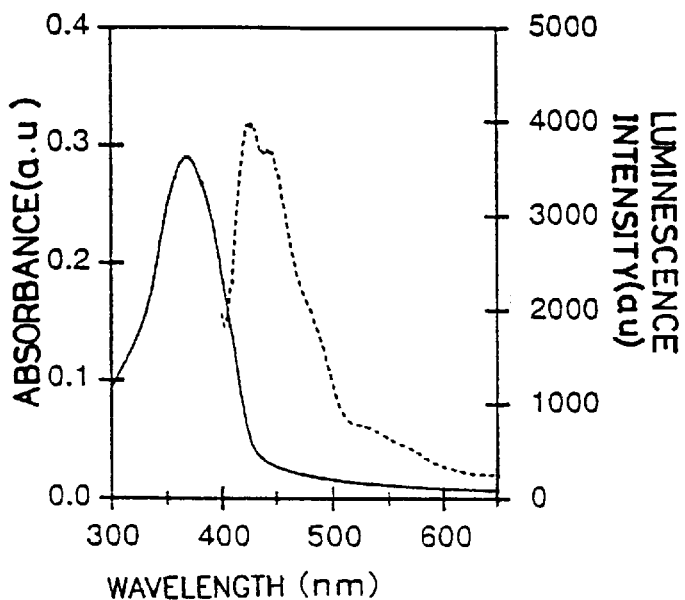
Figures 3, 4, 5, 6, 7, 8, 9, 10, 11, 12, 13, 14, 15, 16, 17, 18:
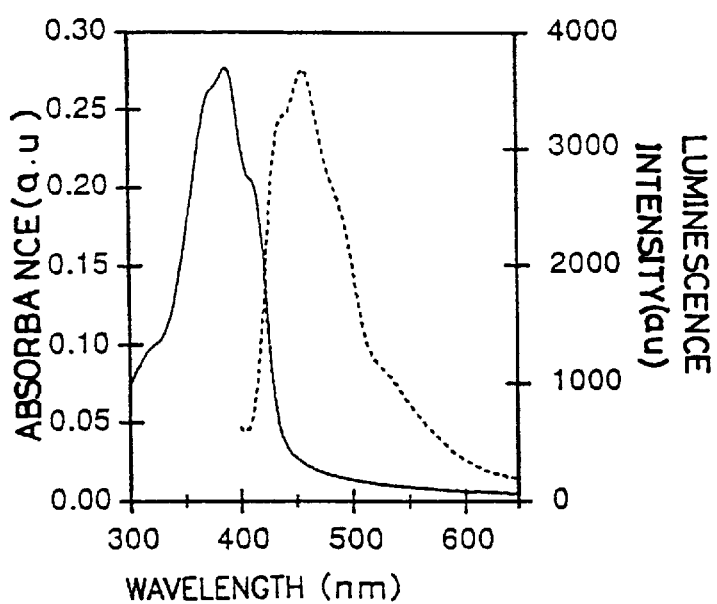
Figures 3, 4, 5, 6, 7, 8, 9, 10, 11, 12, 13, 14, 15, 16, 17, 18, 19:
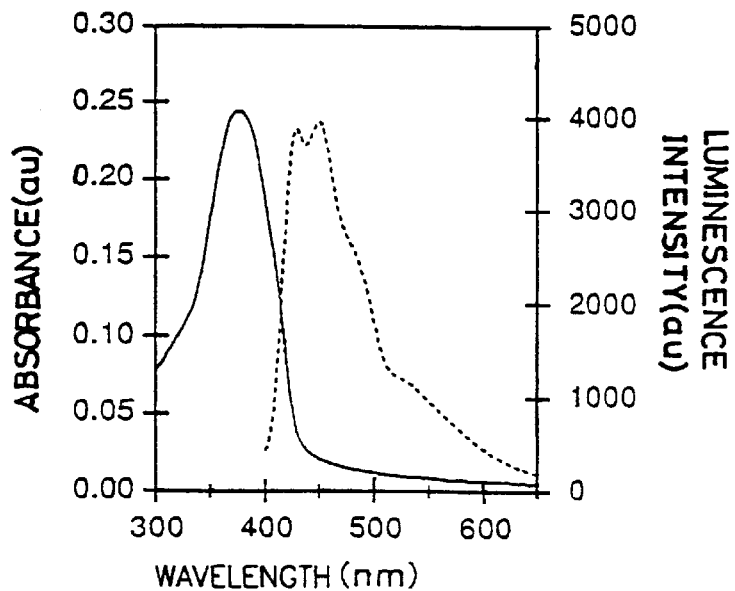
Figures 3, 4, 5, 6, 7, 8, 9, 10, 11, 12, 13, 14, 15, 16, 17, 18, 19, 20:
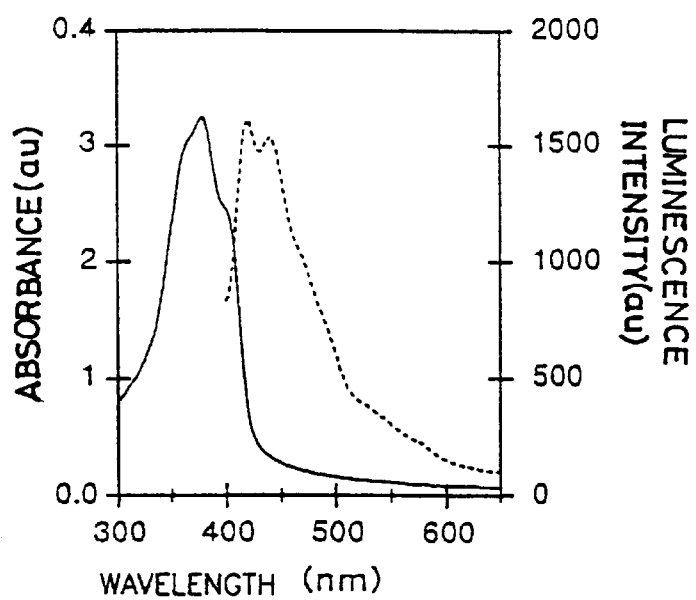
Figures 3, 4, 5, 6, 7, 8, 9, 10, 11, 12, 13, 14, 15, 16, 17, 18, 19, 20, 21:
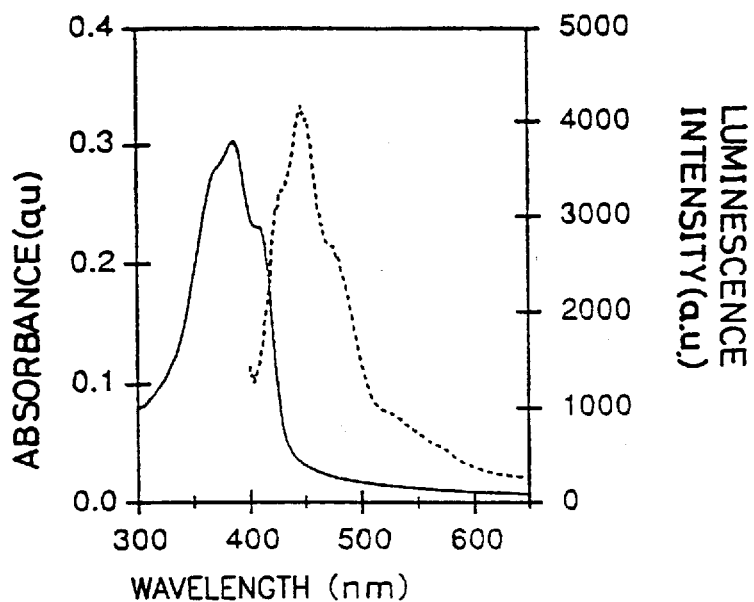
Figures 1, 4:
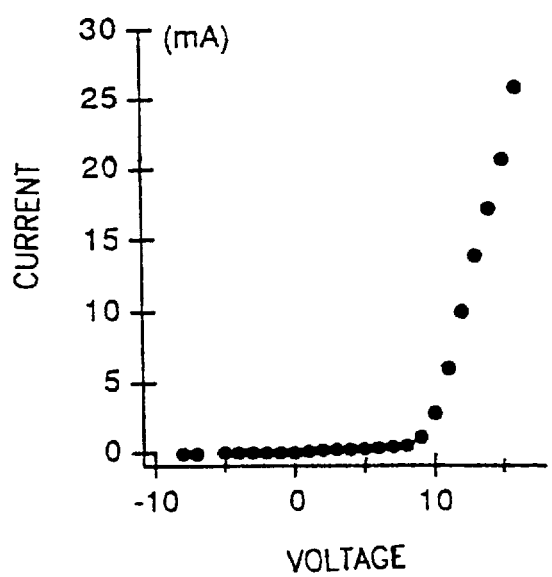
Figures 2, 4:
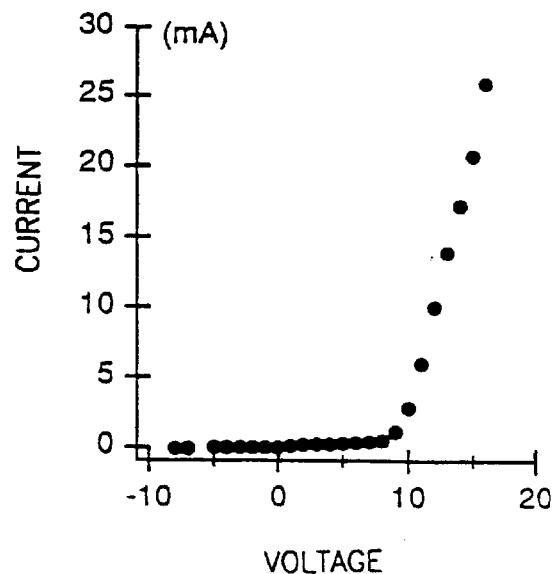
Figures 3, 4:
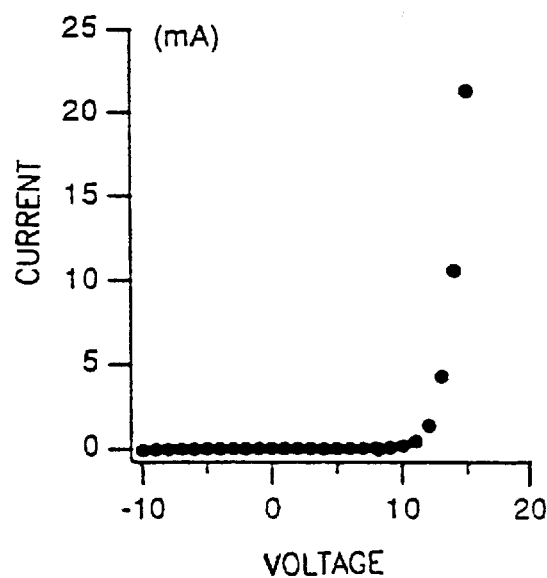
Figure 4:
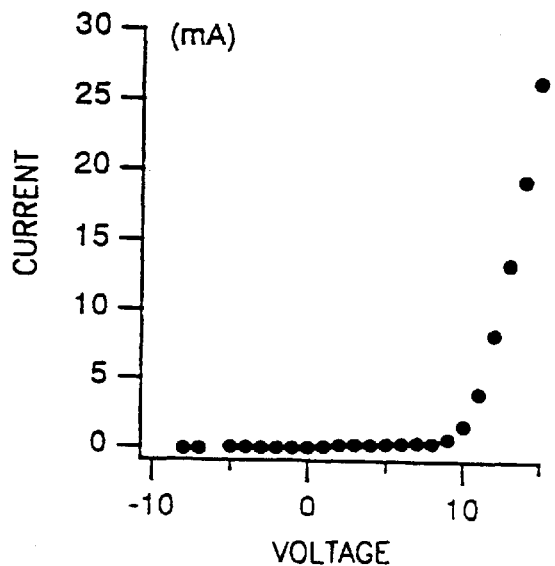
Figures 4, 5:
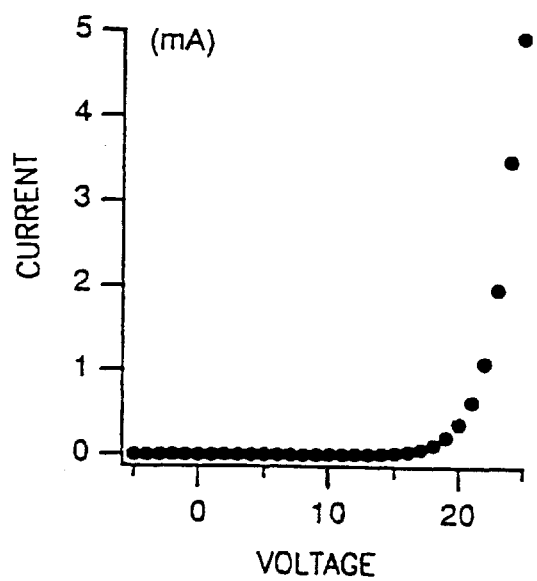
Figures 4, 5, 6:
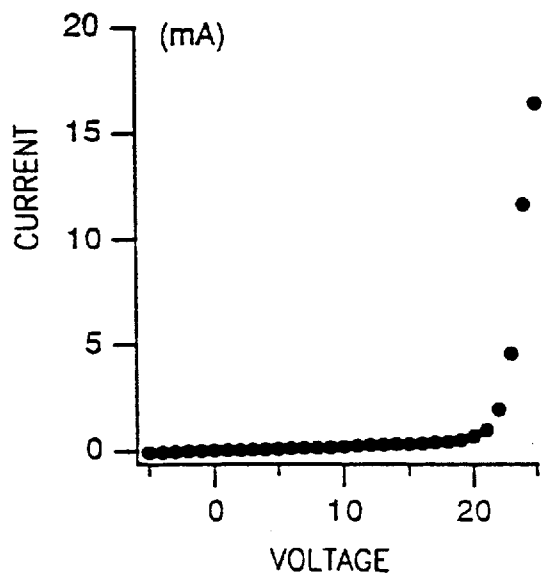
Figures 4, 5, 6, 7:
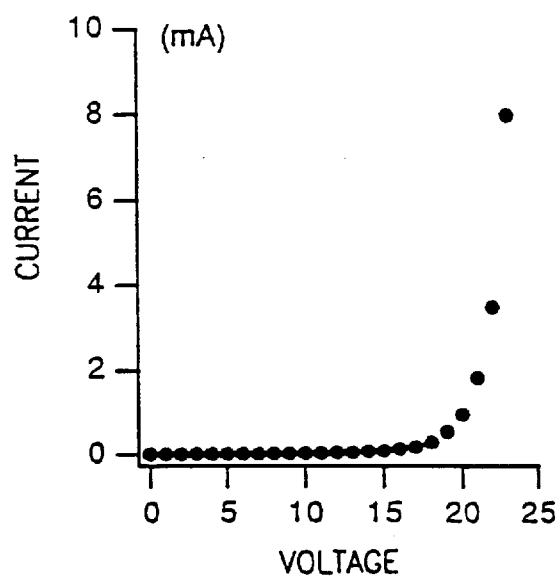
Figures 4, 5, 6, 7, 8:
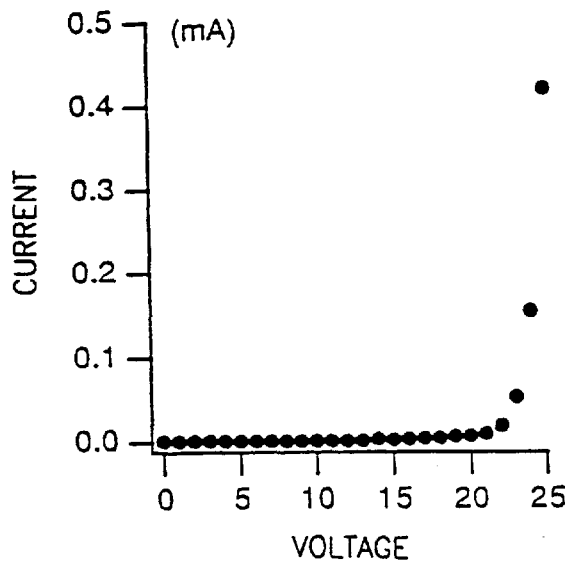
Figures 1, 5:
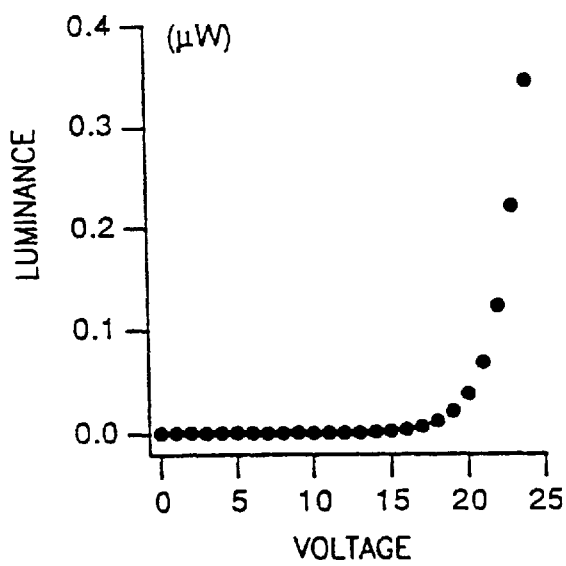
Figures 2, 5:
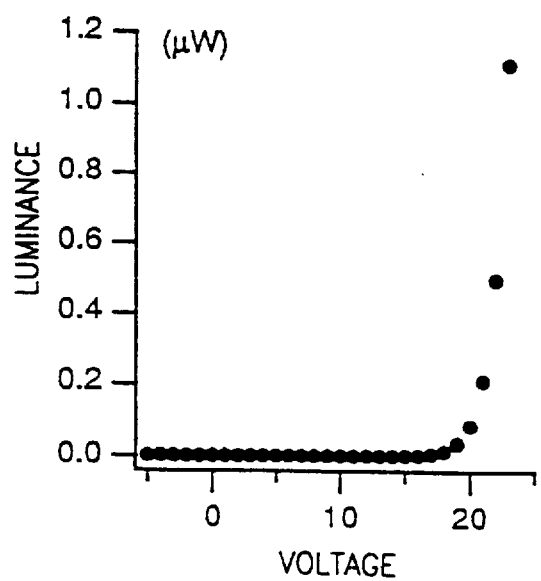
Figures 3, 5:
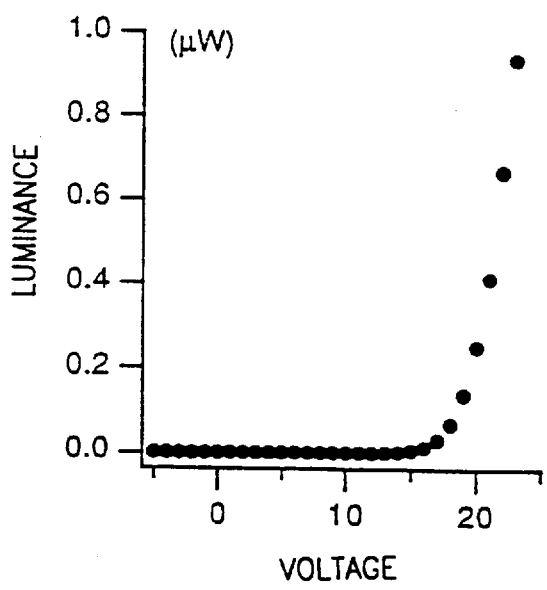
Figures 4, 5:
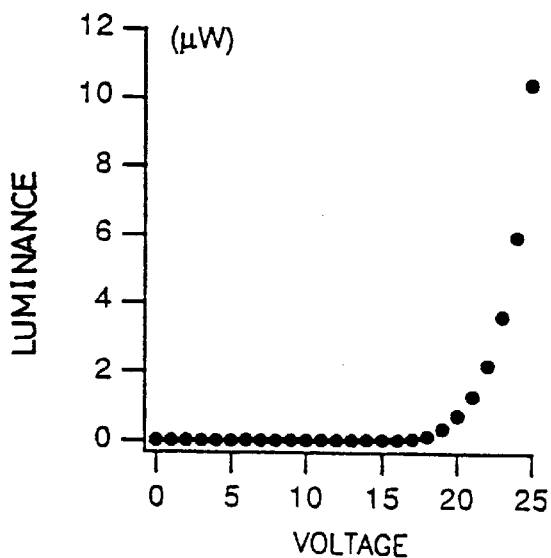
Figures 1, 6:
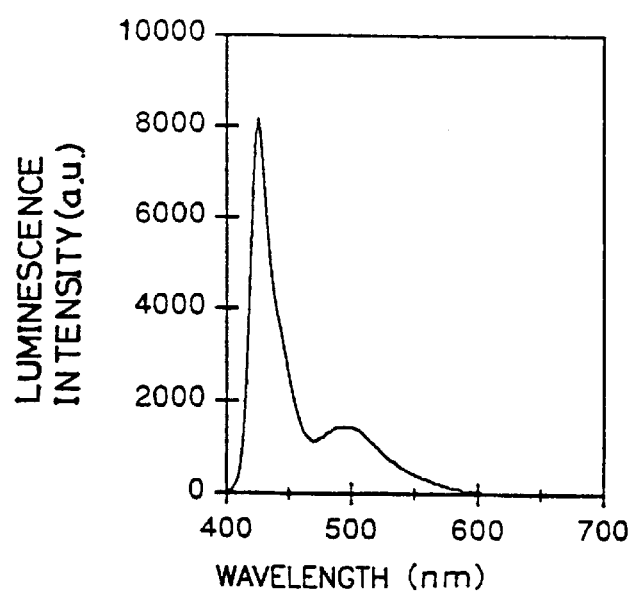
Figures 2, 6:
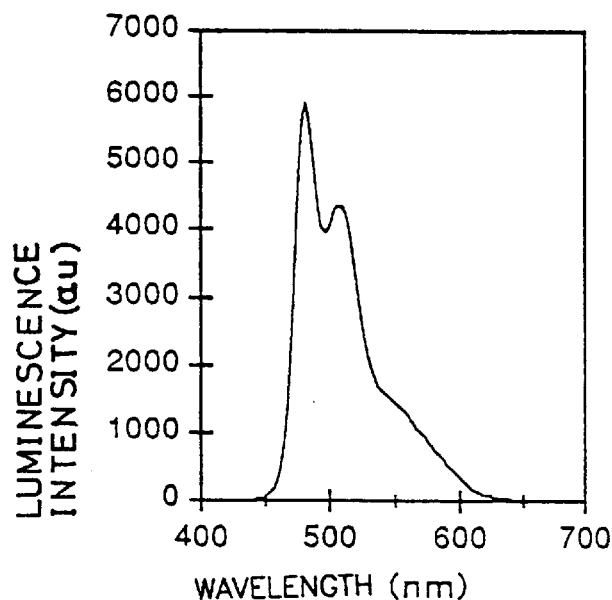
Figures 3, 6:
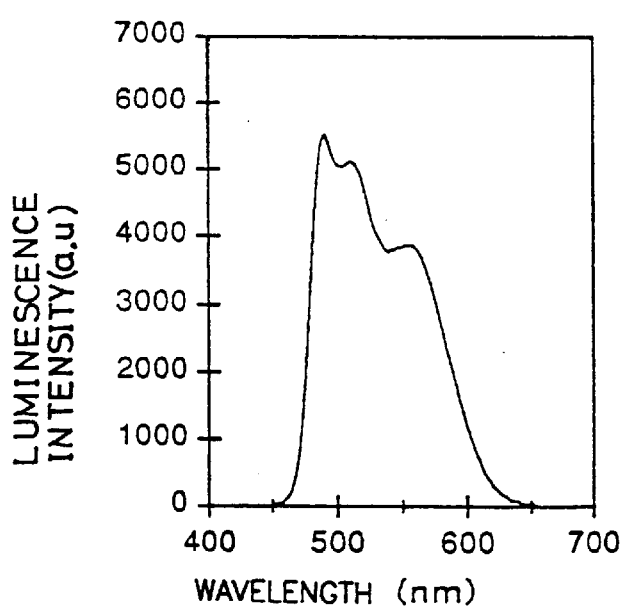
Figures 4, 6:
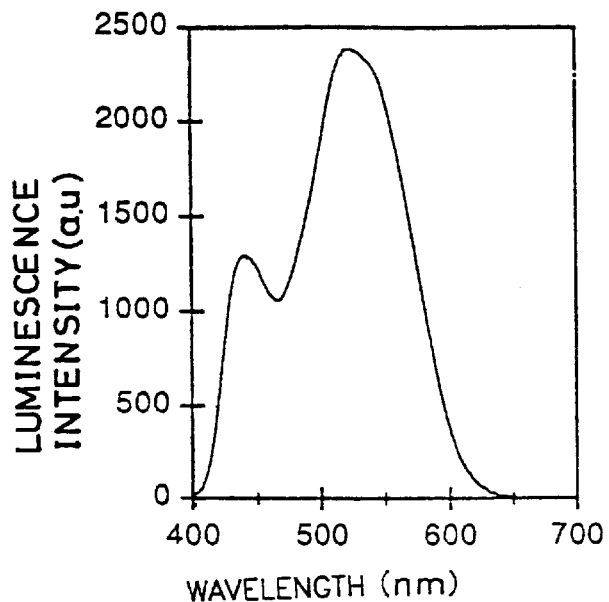
Figures 1, 7:
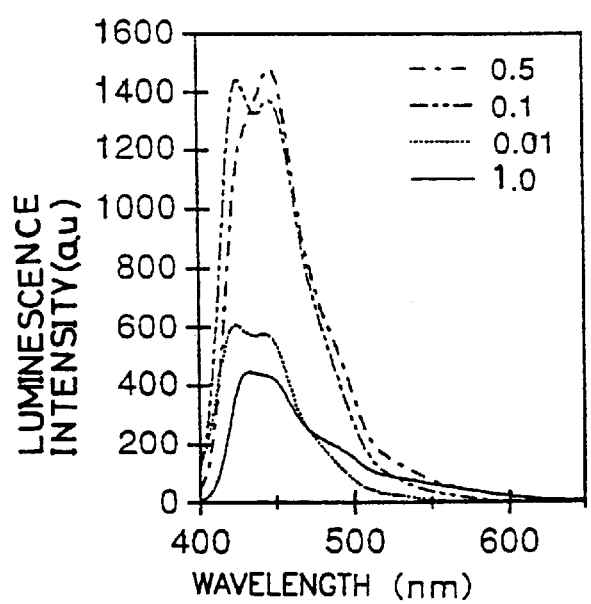
Figures 2, 7:
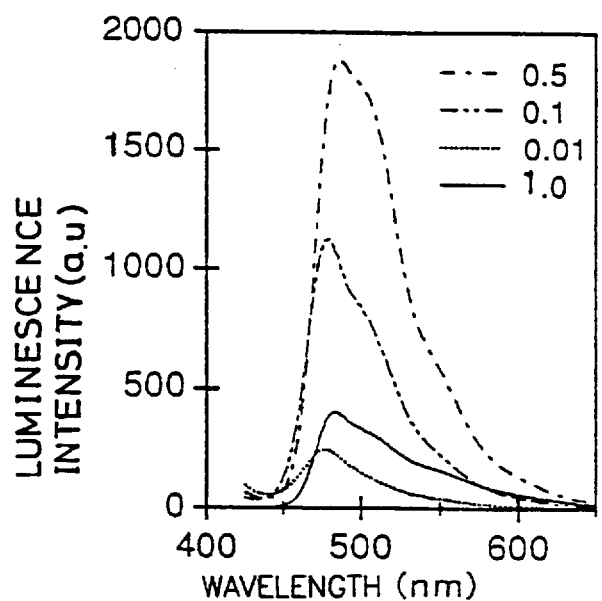
Figures 3, 7:
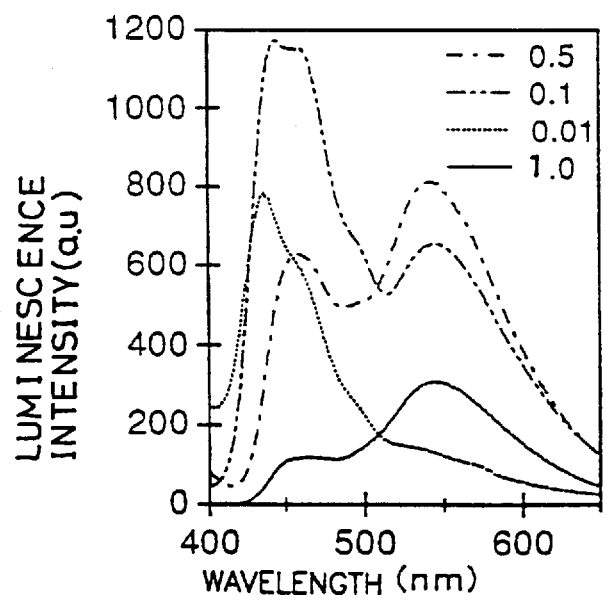
Figures 4, 7:
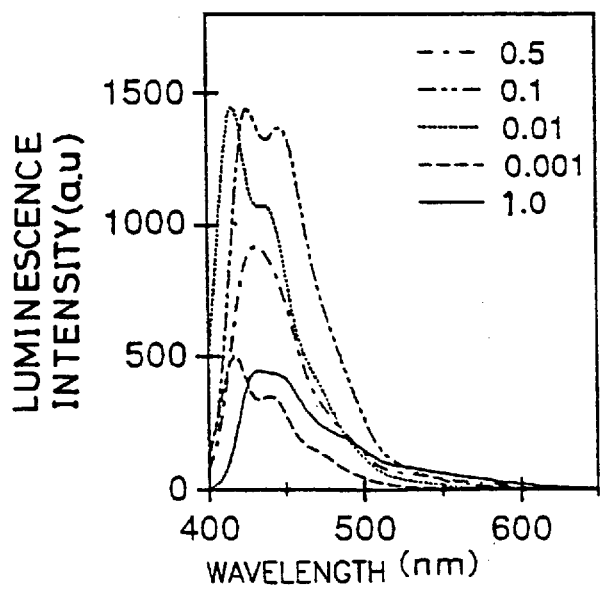
Figures 5, 7:
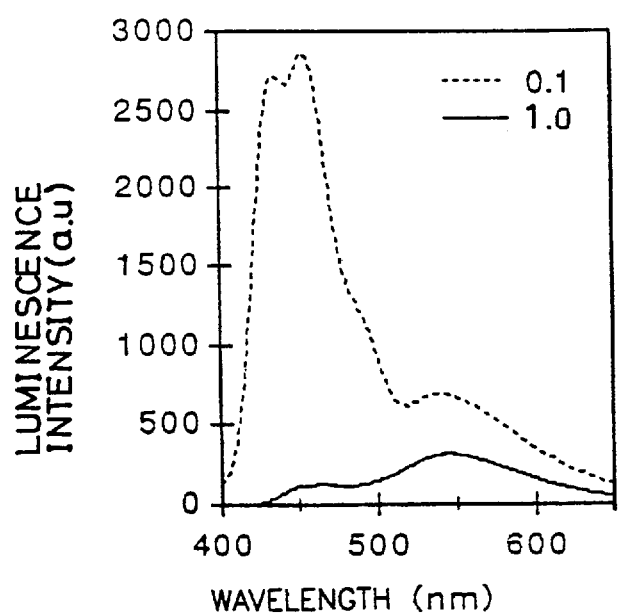
Figures 6, 7:
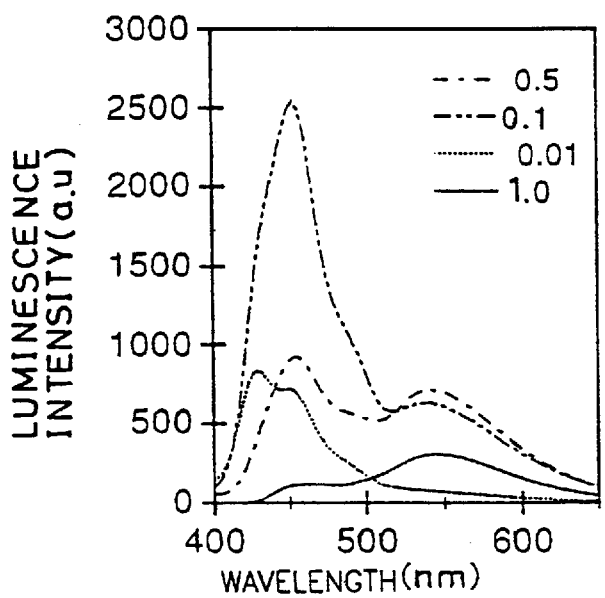
Figure 7:
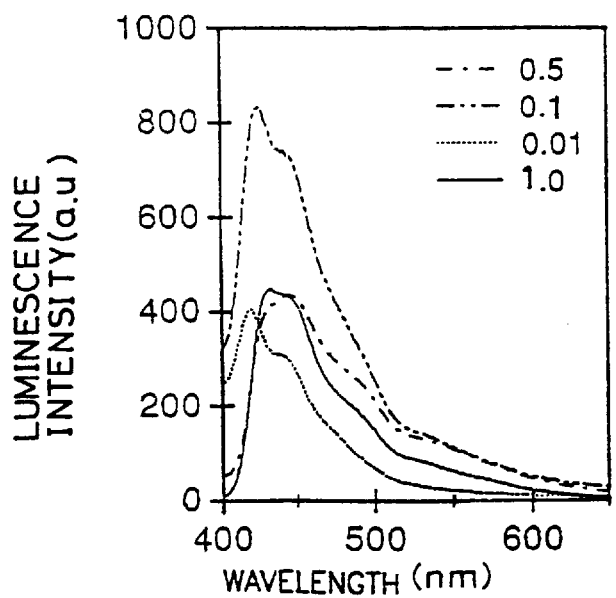
Figures 1, 8:
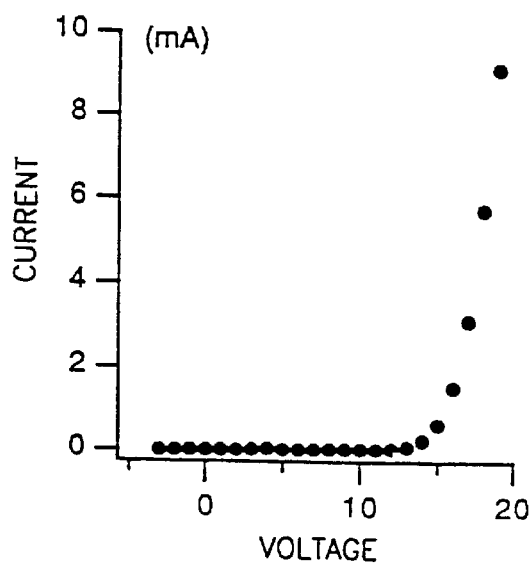
Figures 2, 8:
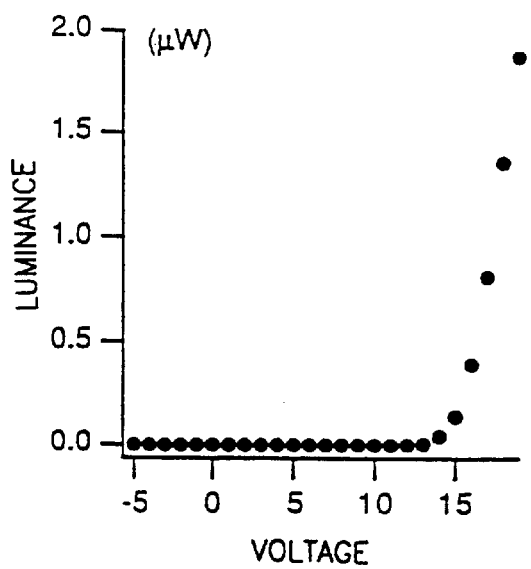
Figures 3, 8:
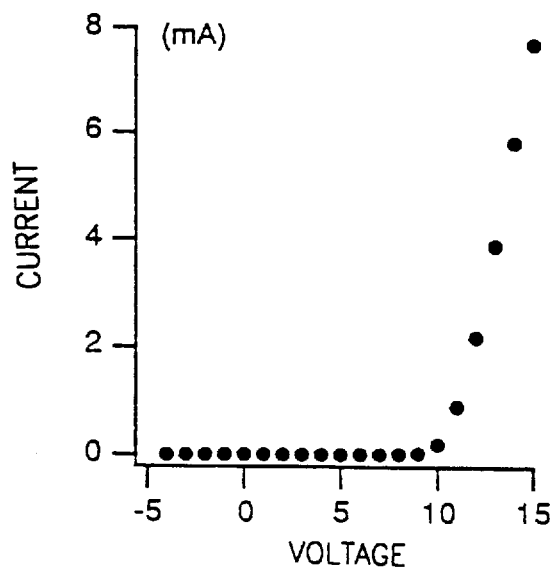
Figures 4, 8:
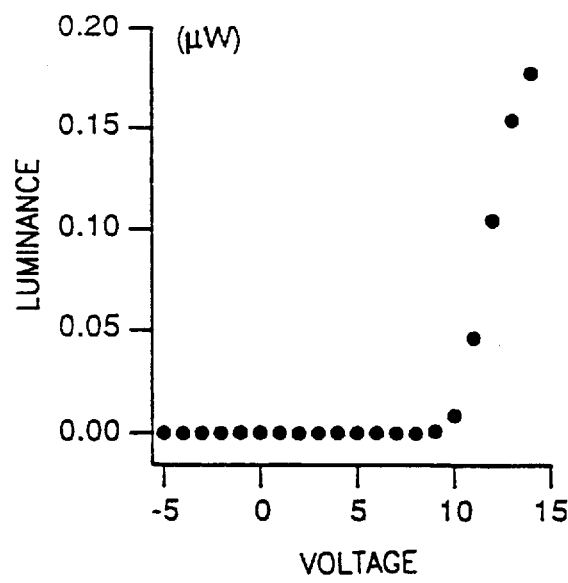
Figures 5, 8:
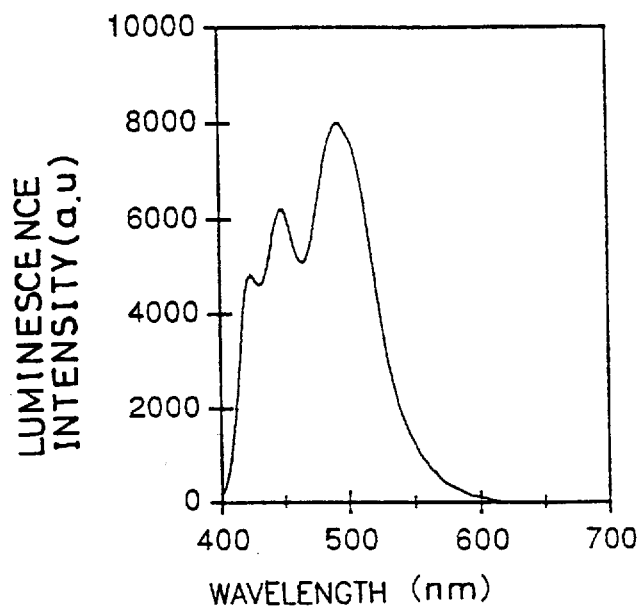
Figures 6, 8:
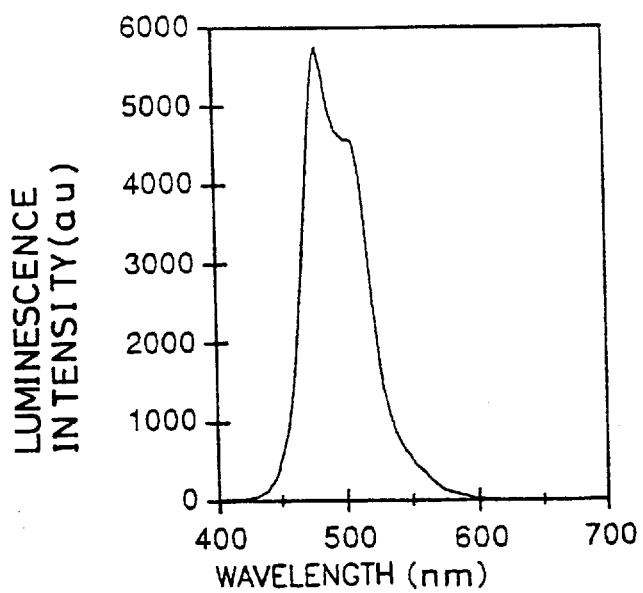
Figure 9:
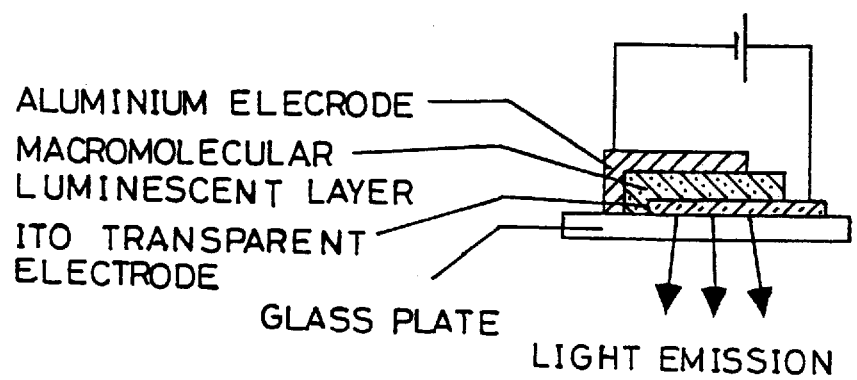

An element consisting of the most generally used ITO/luminescent layer/electrode was made to study the EL characteristics. In this case, as the luminescent layer that was used was the polymer manufactured according to the Examples, or those obtained by blending macromolecules for general use, as described in the present invention, for example, such as polyvinylcarbazole, polymethylmethacrylate, polystyrene, epoxy resin, etc., with the polymers of the present invention, in the present of the chloroform solvent, and as for the material for the electrodes, aluminum was selected. The elements were formed by a vacuum deposition of aluminum on a luminescent layer spin-coated to 100 nanometers on the ITO glass substrate, in the same manner as in the sample manufacturing method for measurement of the UV or PL spectrum. In order to find out the voltage/current characteristics of such EL elements, the variation of current was measured by changing the voltage from −10V to 20V or more if necessary. As shown in FIGS. 4-1 to 4-8 a critical voltage of between 10V to 20V was generally formed in the polymers of the present invention, which signifies that electroluminescence is produced at a voltage higher than such critical voltage. The voltage-electroluminescence characteristics are shown in FIGS. 5-1 to 5-4. For the purpose of analyzing electroluminescent light, the spectrum of light emitted through the ITO glass surface was measured by a spectroscope, and the luminescent color tones were defined by the wavelengths representing the maximum luminescence. The electroluminescent spectra are shown in FIGS. 6-1 to 6-4. The light emitting spectra produced by blending various polymers manufactured according to the Examples with the macromolecules for general use, the voltage-current and voltage-electroluminescence characteristics, and the electroluminescent spectra emitted from elements, are shown in FIGS. 7-1 to 7-7, and FIGS. 8-1 to 8-6, respectively. The constitution of elements used in the present invention is shown schematically in FIG. 9.

What is claimed, is:

1. A fluorene-based alternating copolymer used for luminescent materials of electroluminescent elements, indicated by the following formula (I):

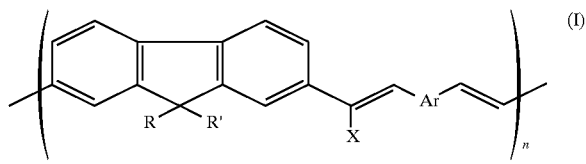

where R and R' which are identical or different, are selected from the group consisting of hydrogen, aliphatic or alicyclic alkyl or alkoxy groups containing 1 to 22 carbon atoms, or aryl or aryloxy group containing 6 to 18 carbon atoms;

X represents hydrogen or a cyano group;

Ar represents compounds substituted from aliphatic or alicyclic alkyl groups containing 1 to 22 carbons, phenyl groups in ortho, meta or para position, or aliphatic or alicyclic alkyl or alkoxy groups containing 1 to 22 carbons, diphenyl, diphenylether, diphenylsulfide and diphenylamine compounds, compounds having two or more phenyl groups, such as pyridine, furan, compounds having hetero atoms, diphenylmethane or diphenylsilane compounds, and bisformylphenoxyalkane or alkoxy compounds; and n represents an integer greater than or equal to 1.

2. An electroluminescent element consisting of anode/luminescent layer/cathode or anode/hole transporting layer/luminescent layer/electron transporting layer/cathode, characterized in that a light emitting material of the luminescent layer is a fluorene-based alternating copolymer of formula (I) according to claim 1.

3. The electroluminescent element according to claim 2, characterized in that the light emitting material of the luminescent layer is a material in which the fluorene-based alternating copolymer having the formula (I) and macromolecule for general use are blended together.

4. The electroluminescent element according to claim 3, characterized in that the macromolecule for general use are selected from the group consisting of polyvinylcarbazole, polymethylmethacrylate, polystyrene and epoxy.

5. The electroluminescent element according to claim 3, characterized in that the fluorene-based alternating copolymer having the formula (I) is blended in the amount of 0.1 to 99.9 weight % based on the amount of the macromolecule for general use.

6. The electroluminescent element according to claim 2, characterized in that the luminescent layer is in the form of a film having thickness of 5 nanometers to 5 microns and a fluorene-based alternating copolymer concentration of more than 0.001% by weight.

7. The electroluminescent element according to claim 6, in which the film thickness of 50 nanometers to 1 micron and the concentration is 0.1–50% by weight.

8. A fluorene-based alternating copolymer according to claim 1 in which R and R' are individually selected from the group consisting of hydrogen, methyl, ethyl, propyl, isopropyl, butyl, isobutyl, pentyl, hexyl, ethylhexyl, heptyl, octyl, isooctyl, nonyl, decyl, dodecyl, hexadecyl, octadecyl, docodecyl, cyclopropyl, cyclopentyl, cyclohexyl, methoxy, ethoxy, butoxy, hexyloxy, methoxyethoxyethyl, methoxyethoxyethoxyethyl, phenyl, phenoxy, tolyl, benzyl, naphthyl and anthracene groups; and Ar represent alkyl, alkoxy, dialkyl or dialkoxyphenyl, fluorene, terphenyl, naphthalene, anthracene, pyridine, furan, thiophene, alkylthiophene, dithiophene, pyrrole, dipyrrole, dipyrrolementane, dibenzofuran, dibenzothiophene, diphenyloxadiazole, dipheylthiadiazole and carbazole.

9. The fluorene-based alternating copolymer according to claim 1 characterized in that R and R' are individually selected from a group consisting of hydrogen and alkyl, and the copolymer has a polymerization degree of 1 to 2,000.

10. The fluorene-based alternating copolymer according to claim 9 characterized in that Ar comprises a divalent form of a radical selected from the group of phenyl, pyrrole, thiophene, furan, pyridine and carbazole, and the copolymer has a degree of polymerization of 3 to 1,000.

11. The fluorene-based alternating copolymer according to claim 10 characterized in that R is hexyl.

12. The fluorene-based alternating copolymer according to claim 11 in which R' is hexyl.

13. The fluorene-based alternating copolymer according to claim 11 in which X is cyano.

14. The fluorene-based alternating copolymer according to claim 12 in which X is hydrogen.

15. The fluorene-based alternating copolymer according to claim 11 in which X is hydrogen.

16. An electroluminescent element consisting of anode/luminescent layer/cathode or anode/hole transporting layer/luminescent layer/electron transporting layer/cathode, characterized in that a light emitting material of the luminescent layer is a fluorene-based alternating copolymer of formula (I) according to claim 9.

17. The electroluminescent element according to claim 16, characterized in that the light emitting material of the luminescent layer is a blend of the fluorene-based alternating copolymer having the formula (I) and macromolecule for general use.

18. An electroluminescent element consisting of anode/luminescent layer/cathode or anode/hole transporting layer/luminescent layer/electron transporting layer/cathode, characterized in that a light emitting material of the luminescent layer is a fluorene-based alternating copolymer of formula (I) according to claim 10.

19. An electroluminescent element consisting of anode/luminescent layer/cathode or anode/hole transporting layer/luminescent layer/electron transporting layer/cathode, characterized in that a light emitting material of the luminescent layer is a fluorene-based alternating copolymer of formula (I) according to claim 11.

20. An electroluminescent element consisting of anode/luminescent layer/cathode or anode/hole transporting layer/luminescent layer/electron transporting layer/cathode, characterized in that a light emitting materials of the luminescent layer if a fluorene-based alternating copolymer of formula (I) according to claim 14.

* * * * *